US008745239B2

(12) United States Patent
Thibeault et al.

(10) Patent No.: US 8,745,239 B2
(45) Date of Patent: Jun. 3, 2014

(54) EDGE-BASED RESOURCE SPIN-UP FOR CLOUD COMPUTING

(75) Inventors: Jason Thibeault, Chandler, AZ (US); Jonathan Cobb, Piedmont, CA (US); David Rowley, Benicia, CA (US); Scott Anderson, San Francisco, CA (US); Abbas Mahyari, Newark, CA (US); Nikita Dolgov, Concord, CA (US); Carl Rivas, San Francisco, CA (US)

(73) Assignee: Limelight Networks, Inc., Tempe, AZ (US)

( * ) Notice: Subject to any disclaimer, the term of this patent is extended or adjusted under 35 U.S.C. 154(b) by 0 days.

(21) Appl. No.: 13/441,812

(22) Filed: Apr. 6, 2012

(65) Prior Publication Data

US 2012/0303818 A1 Nov. 29, 2012

Related U.S. Application Data

(63) Continuation-in-part of application No. 13/245,601, filed on Sep. 26, 2011, now Pat. No. 8,244,874, which is a continuation-in-part of application No. 12/756,956, filed on Apr. 8, 2010.

(51) Int. Cl.
*G06F 15/173* (2006.01)
*G06F 15/16* (2006.01)

(52) U.S. Cl.
USPC ............................ 709/226; 709/235; 709/243

(58) Field of Classification Search
USPC .......................................................... 709/226
See application file for complete search history.

(56) References Cited

U.S. PATENT DOCUMENTS

| | | | |
|---|---|---|---|
| 4,466,063 | A | 8/1984 | Segarra et al. |
| 5,995,756 | A | 11/1999 | Herrmann |
| 5,996,022 | A | 11/1999 | Krueger et al. |
| 5,999,525 | A | 12/1999 | Krishnaswamy et al. |
| 6,052,737 | A | 4/2000 | Bitton et al. |
| 6,094,677 | A | 7/2000 | Capek et al. |
| 6,119,165 | A | 9/2000 | Li et al. |
| 6,141,681 | A | 10/2000 | Kyle |
| 6,163,859 | A | 12/2000 | Lee et al. |
| 6,195,696 | B1 | 2/2001 | Baber et al. |
| 6,310,889 | B1 | 10/2001 | Parsons et al. |

(Continued)

FOREIGN PATENT DOCUMENTS

| | | | |
|---|---|---|---|
| EP | 1309153 | A1 | 5/2003 |
| KR | 2003-0055645 | A | 7/2003 |

(Continued)

OTHER PUBLICATIONS

Open Mobile Alliance, "Generic Content Download Over the Air Specification, Version 1.0," (Announcement Open Mobile Alliance), XP002264099, Proposed Version, Jun. 20, 2002, 2002, pp. 1-40.

(Continued)

*Primary Examiner* — Joseph Greene
(74) *Attorney, Agent, or Firm* — Kilpatrick Townsend & Stockton LLP

(57) ABSTRACT

Aspects of the present invention include distributing new resources closer to end-users which are making increased demands by spinning-up additional virtualized instances (as part of a cloud provisioning) within servers that are physically near to the network equipment (i.e., web servers, switches, routers, load balancers) that are receiving the requests.

18 Claims, 17 Drawing Sheets

300

Start
Receive request for data or service — 305
Determine identification information associated with the request — 310
Based on the identification information, determine the application used to process the request — 315
Container(s) running identified application available? — 320
No → Identify available compute platform — 330
Yes
Container(s) running sufficient to handle request load? — 325
No → Spin-up container running identified application — 335
Yes
Route request to compute platform with the container running the available application — 340
Respond to request — 345
End

(56) References Cited

U.S. PATENT DOCUMENTS 6,347,398 B1 2/2002 Parthasarathy et al.
6,370,588 B2 4/2002 Gebauer
6,400,958 B1 6/2002 Isomursu et al.
6,421,726 B1 7/2002 Kenner et al.
6,546,554 B1 4/2003 Schmidt et al.
6,563,517 B1 5/2003 Bhagwat et al.
6,635,089 B1 10/2003 Burkett et al.
6,637,020 B1 10/2003 Hammond
6,640,238 B1 10/2003 Bowman-Amuah
6,687,737 B2 2/2004 Landsman et al.
6,708,166 B1 3/2004 Dysart et al.
6,742,015 B1 5/2004 Bowman-Amuah
6,832,241 B2 12/2004 Tracton et al.
6,891,802 B1 5/2005 Hubbard
6,917,937 B1 7/2005 Rubendall
6,934,740 B1 8/2005 Lawande et al.
6,947,063 B1 9/2005 Cirulli et al.
6,952,714 B2 10/2005 Peart
6,981,212 B1 12/2005 Claussen et al.
7,000,013 B2 2/2006 Mei et al.
7,065,707 B2 6/2006 Chen et al.
7,155,478 B2 12/2006 Ims et al.
7,203,901 B2 4/2007 Chen et al.
7,308,649 B2 12/2007 Ehrich et al.
7,356,575 B1 4/2008 Shapiro
7,433,935 B1 10/2008 Obert
7,636,768 B2 12/2009 Yang et al.
8,074,229 B2 * 12/2011 Brunswig et al. ............. 719/312
8,266,204 B2 9/2012 Bansal et al.
8,321,521 B1 11/2012 Raciborski et al.
8,356,074 B1 1/2013 Ehrlich et al.
2001/0037389 A1 11/2001 Fujimori et al.
2001/0047428 A1 11/2001 Hunter
2001/0056444 A1 12/2001 Ide et al.
2002/0056010 A1 * 5/2002 Lincoln et al. ................ 709/247
2002/0091848 A1 7/2002 Agresta et al.
2002/0099798 A1 7/2002 Fedorovsky et al.
2002/0099829 A1 7/2002 Richards et al.
2002/0116518 A1 8/2002 Silen et al.
2002/0138588 A1 9/2002 Leeds
2003/0014630 A1 1/2003 Spencer et al.
2003/0018950 A1 1/2003 Sparks et al.
2003/0084425 A1 5/2003 Glaser
2003/0101434 A1 5/2003 Szyperski
2003/0110234 A1 6/2003 Egli et al.
2003/0177477 A1 9/2003 Fuchs
2003/0225836 A1 12/2003 Lee et al.
2004/0019497 A1 1/2004 Volk et al.
2004/0073596 A1 4/2004 Kloninger et al.
2004/0093396 A1 5/2004 Akune
2004/0205172 A1 10/2004 Kim
2004/0236795 A1 11/2004 Johnston
2004/0267912 A1 12/2004 Kim
2005/0044527 A1 2/2005 Recinto
2005/0049886 A1 3/2005 Grannan et al.
2005/0071806 A1 3/2005 Sreedhar
2005/0119977 A1 6/2005 Raciborski
2005/0131971 A1 6/2005 James et al.
2005/0289535 A1 12/2005 Murray et al.
2006/0036570 A1 2/2006 Schaefer et al.
2006/0055963 A1 3/2006 Otsuka et al.
2006/0143247 A1 6/2006 Poole et al.
2006/0174190 A1 8/2006 Gomes et al.
2006/0212843 A1 9/2006 Zaky et al.
2007/0113225 A1 5/2007 Felts
2007/0118667 A1 5/2007 McCarthy et al.
2008/0072264 A1 3/2008 Crayford
2008/0091792 A1 4/2008 Mei et al.
2008/0091808 A1 4/2008 Mei et al.
2009/0013063 A1 1/2009 Soman
2009/0049502 A1 2/2009 Levien et al.
2009/0106447 A1 4/2009 Lection
2009/0298478 A1 * 12/2009 Tyhurst et al. ............. 455/414.1
2010/0223364 A1 9/2010 Wei
2010/0229108 A1 9/2010 Gerson et al.
2011/0078333 A1 * 3/2011 Jakubowski .................. 709/248
2011/0099233 A1 4/2011 Calder et al.
2011/0119381 A1 5/2011 Glover et al.
2011/0145413 A1 * 6/2011 Dawson et al. ............... 709/226
2011/0166835 A1 7/2011 Devarakonda et al.
2011/0225231 A1 9/2011 Bansal et al.
2011/0265164 A1 * 10/2011 Lucovsky et al. ................. 726/7
2012/0069131 A1 3/2012 Abelow
2012/0110186 A1 5/2012 Kapur et al.
2012/0147894 A1 6/2012 Mulligan et al.
2012/0190458 A1 7/2012 Gerson et al.
2012/0209901 A1 8/2012 Xu et al.
2012/0226794 A1 9/2012 Calder et al.
2012/0226799 A1 9/2012 Kapur et al.
2012/0239792 A1 9/2012 Banerjee et al.
2012/0311159 A1 12/2012 Bansal et al.
2013/0110984 A1 5/2013 Raciborski et al.

FOREIGN PATENT DOCUMENTS

KR 2003-0094163 A 12/2003
KR 2006-0064503 A 6/2006
WO WO 2009/101414 A2 8/2009

OTHER PUBLICATIONS

U.S. Appl. No. 12/756,956, Final Office Action mailed Jan. 6, 2012, 32 pages.
U.S. Appl. No. 12/756,956, First Action Interview Pilot Program Pre-Interview Communication mailed Oct. 7, 2011, 6 pages.
U.S. Appl. No. 13/572,505 Notice of Allowance mailed May 24, 2013, 9 pages.
International Search Report and Written Opinion of PCT/US2012/057148 mailed on Mar. 26, 2013, 9 pages.
U.S. Appl. No. 12/756,956, Non-Final Office Action mailed Mar. 5, 2013, 30 pages.

* cited by examiner

100

*--Prior Art --*

| Publisher | Site | Encoding Profiles | Advertising Index |
|---|---|---|---|
| Company A | companyA.sports.com | E1, E2, E3 | ID1, ID2, ID4 |
| Company A | companyA.news.com | E5, E6, E9 | ID2, ID5, ID17 |
| Company B | companyB.com | E1-7 | ID3, ID5, ID16 |
| Company C | companyC.com | E2-5, E17, E23 | ID1, ID2, ID15, ID27 |
| ● ● ● | ● ● ● | ● ● ● | ● ● ● |

*FIG. 7*

| Profile | Codec | Container | Frame size | Bit rate | Description |
|---|---|---|---|---|---|
| E1 | QT | MPEG2 | 480x369 | 900 kbps | Mobile, high bitrate, streaming |
| E2 | H.264 | 3GP | 480x320 | 124 kbps | Streaming |
| E3 | MP3 | MP3 | --- | 64 kbps | Podcast |
| LCD | MPEG4 | 3GP | 176x144 | 100 kbps | Generic mobile device |
| ● ● ● | ● ● ● | ● ● ● | ● ● ● | ● ● ● | ● ● ● |

*FIG. 8*

| Object | Processed | Profiles | UURL |
| --- | --- | --- | --- |
| homerun.mpg | 3.16.09 | E1, E2, E3 | http://company.x/sports/homerun.mpg |
| interview.mov | 3.18.09 | E4, E6 | http://company.x/news/interview.mov |
| popvideo.wmv | ... | E1-5, E9-12 | Pending... |
| • • • | • • • | • • • | • • • |

*FIG. 9*

| DeviceID | Processor | Screen size | Color Depth | OS | Media/Codecs | Media Delivery Protocol | Media Orchestration Scheme |
|---|---|---|---|---|---|---|---|
| Blackberry Bold 9000 | 624 MHz | 480x320 | 65k | Blackberry OS | H.263, H.264, 3GP, MP3, AAC, ... | RTSP | RSDH |
| Blackberry Storm 9550 | 528 MHz | 480x360 | 65k | Blackberry OS | MPEG4, H.263, H.264, 3PG, MP3, AAC, ... | RTSP | RSDH |
| iPhone/OS 2.x | 600 MHz | 480x320 | 16M | iPhone OS 2.x | H.264, MPEG-4, AAC, ... | HTTP, RTSP | HPD |
| iPhone/OS 3.x | 600 MHz | 480x320 | 16M | iPhone OS 3.x | H.264, AAC, ... | HTTP, RTSP | IHS |
| HTC Nexus One | 1000 MHz | 480x800 | 16M | Android 2.1 | H.264, AAC, MPEG4 | RTSP | RSD |
| Unknown | — | 320x240 | 256 | — | H.263, MP3 | HTTP | RSD |
| • • • | • • • | • • • | • • • | • • • | • • • | • • • | • • • |

FIG. 10

EDGE-BASED RESOURCE SPIN-UP FOR CLOUD COMPUTING

CROSS-REFERENCES TO RELATED APPLICATIONS

The present application is a continuation-in-part of U.S. application Ser. No. 13/245,601, filed on Sep. 26, 2011, entitled, "EDGE-BASED RESOURCE SPIN-UP FOR CLOUD COMPUTING," which is hereby incorporated by reference in its entirety for all purposes. The present application is also a continuation-in-part of U.S. application Ser. No. 12/756,956 filed on Apr. 8, 2010, entitled, "SYSTEM AND METHOD FOR DELIVERY OF CONTENT OBJECTS," which claims priority to Australian Patent Application Serial No. 2010201379 filed on Apr. 7, 2010, entitled "SYSTEM AND METHOD FOR DELIVERY OF CONTENT OBJECTS."

FIELD OF INVENTION

The present application relates generally to provisioning request-responding resources. More particularly, it concerns a. providing edge-based resources for carrying out computational activities within a cloud environment.

BACKGROUND

Presently, compute resources (i.e., applications, etc.) within a cloud provider's network are spun-up in a cluster (e.g., servers which are aggregated in a centralized location, a datacenter, etc.). All requests are load-balanced back to that cluster. Unfortunately, such an implementation does not necessarily provide the best performance or experience for end users who may, for example, be located far away from the centralized cluster.

This problem is further compounded by the fact that applications provided within the "cloud" are becoming more robust and require additional resources and computing power as well as faster response times. Accordingly, the computations being preformed over the web are becoming increasingly more intensive. As such, with the centralized cluster approach, many of these computations are being routed away from the user which adds to or even causes delays and an unacceptable user experience.

One example of a current implementation is illustrated by method 100 of FIG. 1. A data center 105 includes a compute platform 110 which is in communication with devices which produce user requests 115. As such, user requests 115 are received by the data center 105, which includes the cloud resources. As requests increase, software and services within the data center 105 are spun-up by additional cloud resources using the compute platform 110. The distance between the compute platform 110 and the user requests 115 may be great, and therefore, responsiveness and user experience are diminished greatly.

Furthermore, in the current cloud-service environments, customers must deploy their applications to a single cloud, and utilize the elasticity of the cloud to determine additional resources and spin those up accordingly within the cloud environment. Unfortunately, if the cloud provider is experiencing difficulties (either regionally or globally), the customer has no way to re-route requests to another cloud, and thus performance is dramatically impacted. Thus, for at least these reasons, improvements in the art are needed.

BRIEF SUMMARY

In one embodiment, aspects of the present invention distribute new resources closer to end-users which are requesting the resource. As such, additional virtualized instances (as part of a cloud provisioning) are spun-up within servers that are physically near to the network equipment (i.e., web servers, switches, routers, load balancers) which are receiving the requests. Accordingly, by moving computational resources closer to the requesting users in cloud computing environments, the user experience is significantly enhanced.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

Further aspects of the present invention include dynamically routing requests for applications to one of multiple cloud computing environments. Alternatively, the method may dynamically route an application request to an application that is hosted in multiple clouds (deployed within a management application) based upon a specified criteria. In one embodiment, the routing of requests for the application to a specific cloud in which the application is deployed may be based upon a criteria(s) that the application owner specifies. This may provide the application owner an ability to positively affect quality of service (QoS) for application delivery, ensure uninterrupted access to the application in the event of failure by one or more clouds, and provide more efficient application performance.

BRIEF DESCRIPTION OF THE DRAWINGS

FIG. 7 shows exemplary publisher information.

FIG. 8 shows exemplary encoding profiles.

FIG. 9 shows exemplary information relating to versions of a content object.

FIG. 10 shows exemplary device capabilities information.

In the figures, similar components and/or features may have the same reference label. In some cases, components of the same type are identified by following a first reference label with a dash and a second reference label that further distinguishes among the similar components. If only the first reference label is used, the description is applicable to any of the similar components designated by the first reference label.

DETAILED DESCRIPTION OF EMBODIMENTS

The ensuing description provides preferred exemplary embodiment(s) only, and such preferred exemplary embodiments are not intended to limit the scope or applicability of the present invention. Rather, the ensuing description will enable those who are skilled in the art to implement such preferred exemplary embodiment(s). Persons of skill in the art will recognize that various changes may be made in the function and arrangement of elements without departing from the spirit and scope of the invention as set forth in the appended claims.

Figure 1:
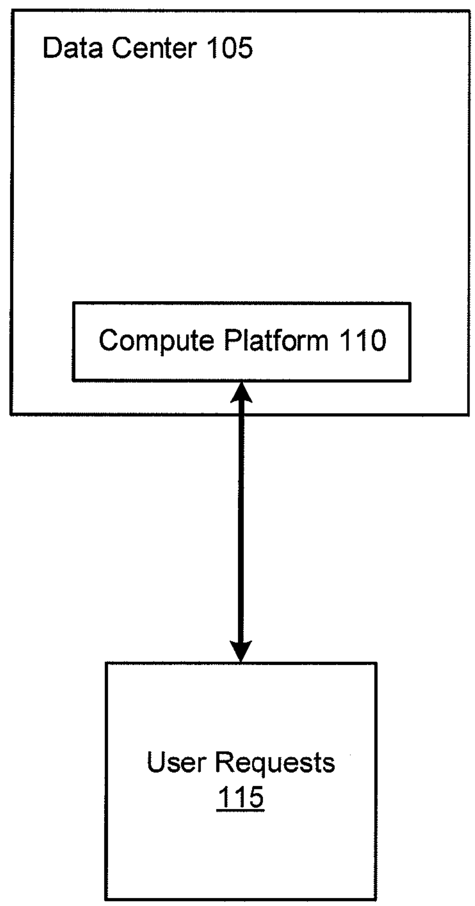
FIG. 1 shows a system for implementing cloud computing.
Figure 2:
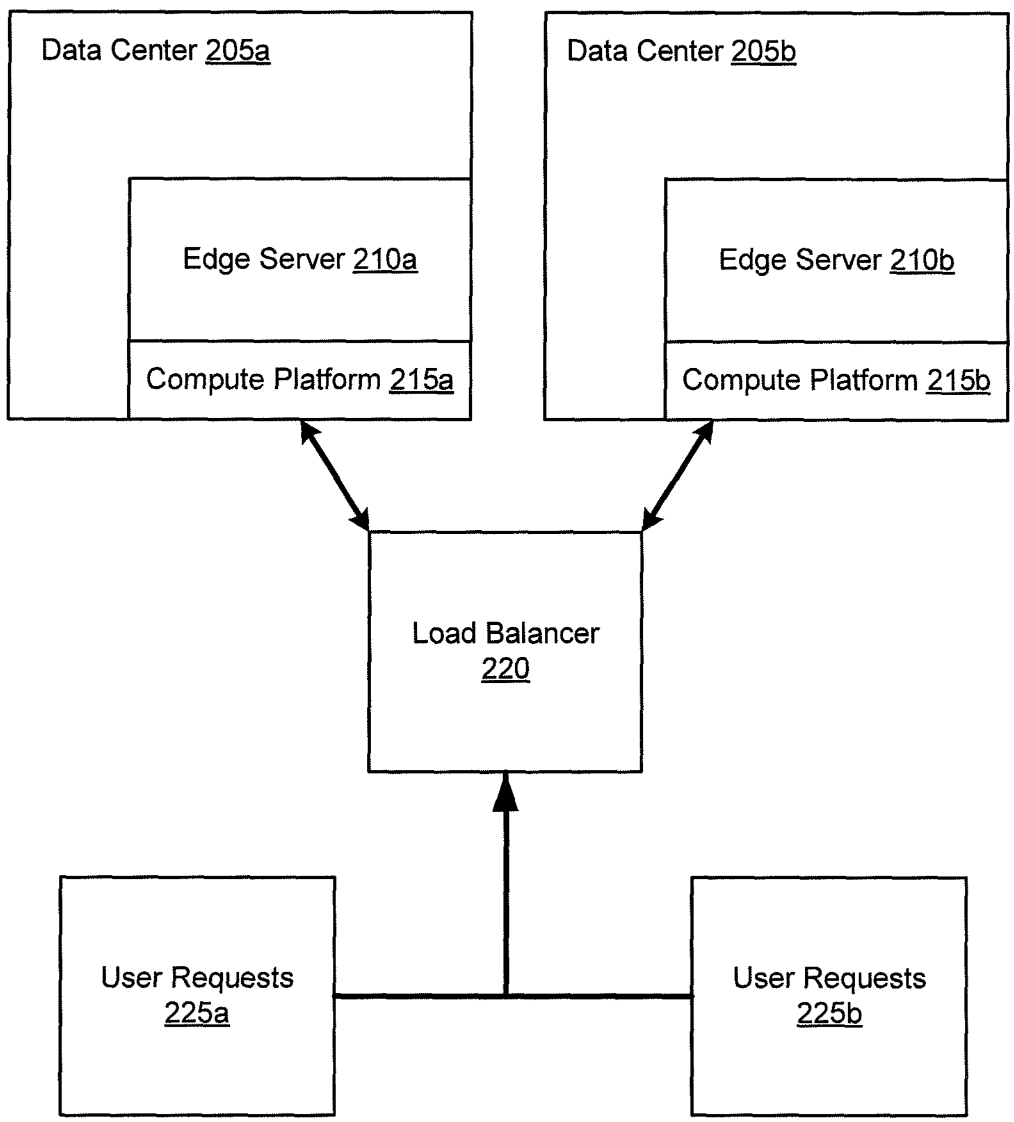
FIG. 2 shows a system for implementing edge-based resource spin-up for cloud computing.

FIG. 2 shows a system for implementing edge-based resource spin-up for cloud computing, in accordance with one embodiment of the present invention. In one embodiment, edge-based resource spin-up includes carrying out computational activities within a cloud computing environment closer to the end user. As such, an increase in responsiveness as well as a more efficient use of resources is realized. System 200 includes a data center 205*a* and 205*b*. In one embodiment, data centers 205 may be a facility used to house computer systems and associated components, such as telecommunications, networking systems, storage systems, etc. Furthermore, the data centers 205 may also be designated as points of presence (PoPs).

In one embodiment, the data centers 205*a* and 205*b* may include edge servers 210*a* and 210*b*, respectively. Further, edge servers 210*a* and 210*b* may include compute platforms 215*a* and 215*b*, respectively. It should be noted that one skilled in the art would conclude that any number of data centers, edge serves, and/or compute platforms may be included, and only two of each are shown for ease of explanation and illustration.

In a further embodiment, system 200 may include a load balancer 220 in communication with both data centers 205*a* and 205*b*, as well as user devices issuing user requests 225*a* and 225*b*. In a cloud computing environment such as the one depicted in system 200, many user requests may be received, and proper allocation and division of cloud resources should be allocated to handle the requests. Furthermore, many of the requests are time sensitive and latency sensitive (i.e., UI intensive applications, computation intensive applications, etc.), so ensuring fast response times to requests can be important. As such, in the confirmation of system 200, the load balancer 220 is configured to determine the "fastest" responding edge server/compute platform to direct the request. In one embodiment, fastest response time means the edge server closest physically to the requesting user device. Alternatively, fastest may mean the edge server with the lowest latency relative to the requesting device. In some instances, the closest and the lowest latency edge server may be the same server, but not always. For example, if the physically closest edge server is experiencing a heavy load of traffic and requests, the response time and/or network latency of the server may outweigh the physically close proximity to the requesting device.

In other words, the load balancer 220 is configured to ensure that the needed resources to respond to the user requests 225*a* and 225*b* are routed to the edge servers 210*a* and 201*b* which will provide the fastest response time for the request, which in many cases will be the edge server which is in the closest proximity to the requesting user device.

In one example, two groups of users make requests from two different geographical locations. The load balancer 220 then receives the requests and, based on the location of the request, distributes the request to the data center 205*a* or 205*b* closest to the user (alternatively, the request may be routed to the data center which will provide the faster response time). Once the request is routed, it is received by a "localized cloud instance" which is a de-centralized cloud computing environment with resources spun-up as physically close to the requesting device as possible. In one embodiment, such localized resources may be synchronized around the network to ensure that requests come to one localized cluster are treated in the same manner as other requests. Then, based on the request load that is delivered to that "localized cloud instance," resources are spun-up in that locality based upon demand (i.e., subsequent user requests).

Figure 3:
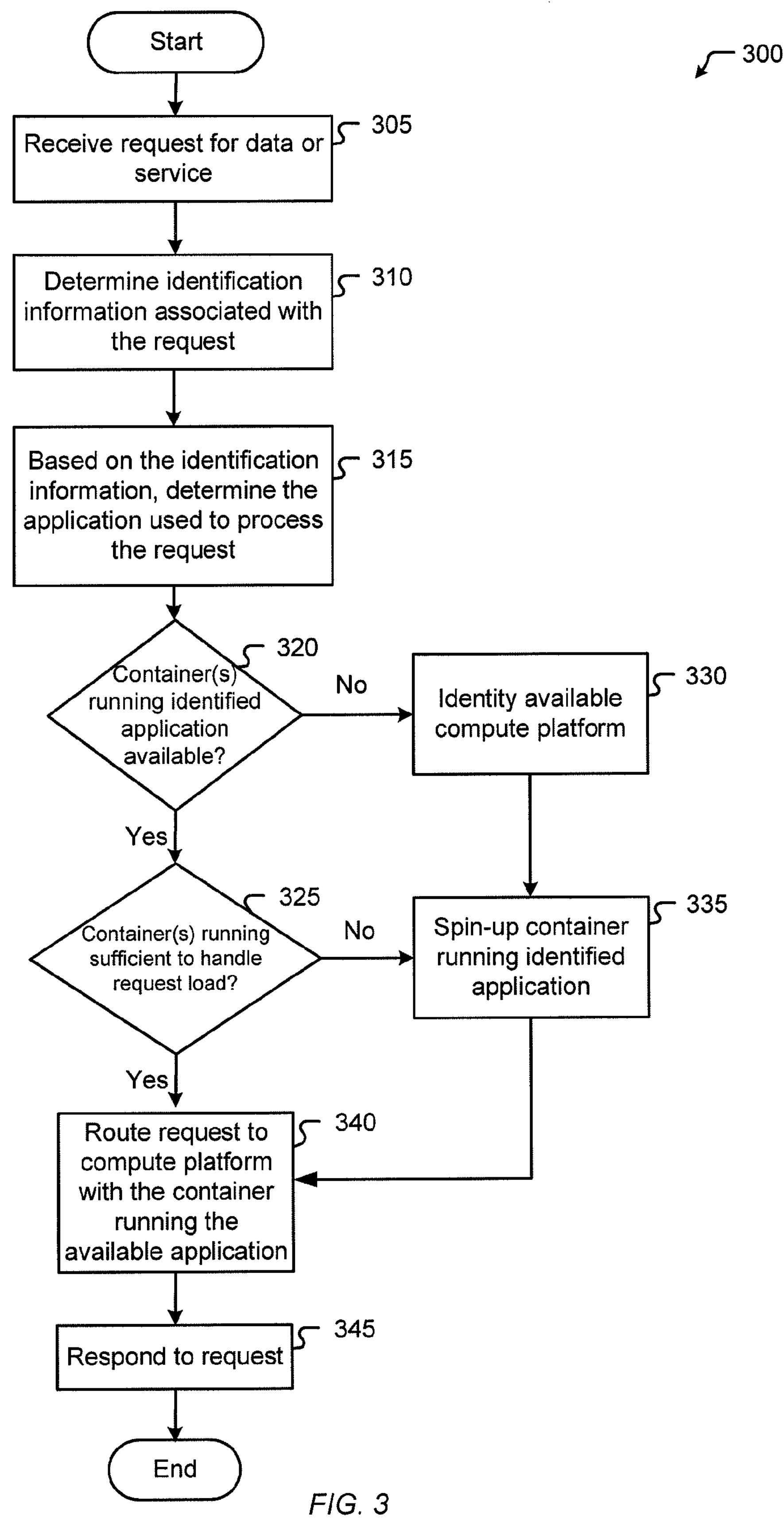
FIG. 3 shows a method of implementing edge-based resource spin-up for cloud computing.

FIG. 3 shows a method 300 of implementing edge-based resource spin-up for cloud computing, in accordance with one embodiment of the present invention. At process block 305, a request for data or a service may be received at an edge server from a user device. In one embodiment, the closest edge server to the requesting device may be determined by using an enhanced anycast methodology. Accordingly, the edge server which provides the fastest response time relative to the requesting user device is selected.

In one embodiment, the request may be for an application, such as an enterprise application, a media application, etc. Alternatively, the request may be for data, such a video file, a music file, a document, etc. Each request may have associated information sent with the request which identifies the application and/or data used to service the request. The identification information may be embedded or attached to the request.

Furthermore, at process block 310, the edge server may extract the identification information. Then, based on the information, the edge server can identify the application/service used to process the request (process block 315). For example, the identification information may specifically identify the application by name or some other identifier, or alternatively the information may include an application type, etc.

Further, the selected edge server may be in communication with one or more compute platforms, which may be co-located or remotely-located with the edge server. Additionally, each of the compute platforms may have one or more containers running which provide a virtual construct for allocating resources. In one embodiment, these containers may be a type of virtualized resource which is different from a virtualized instanced, such as elastic computing cloud (EC2). The containers are then configured to execute and maintain applications needed to service the user requests. Hence, at decision block 320, a determination is made whether a container maintained by a compute platform in communication with the selected edge server is running (or capable of running) the application necessary for servicing the user request. In one embodiment, all of the edge-based compute platforms may include the "DNA" for running an application (e.g., an XML dataset that specifies instructions for each application to be run in a container), and the determination for being able to run the application based on the current levels of utilization. As such, the allocation of the compute platform becomes a predictive determination. In one embodiment, a compute platform is capable of running the application if the compute platform has sufficient unused resources, if the necessary application is loaded on the compute platform, etc.

If the application is not running on any of the containers within the compute platforms, then at process block 330, an available compute platform (or on other words, a compute platform which has available resources) is identified. Accordingly, it may not matter if the application is not currently running, as the application can be spun up; availability can be based on either a currently running application or the necessary capacity to support the application running, which could then be translated to actually spinning up a container, on demand, to support the requests. Then, one or more containers are spun-up by the identified compute platform to run the identified application or service (process block 335).

Alternatively, if there is a container identified as running the application, then a determination is made whether the container has sufficient resources to handle the increased load of the new request (decision block 325). If the container does not have sufficient resources to handle the increased load, then at process block 335, a container (or containers) may be spun-up to run the identified application. Alternatively, if the container has sufficient resources to handle the increased load, then at process block 340, the request is routed to the compute platform with the container already running the identified application. As such, the load is effectively balanced to the compute platform and container with available resources from the edge server with the closest physical proximity to the requesting device; thus, providing the most efficient user experience.

One example of an implementation of method 300 may be performed for the MediaTag™ application. In one embodiment, a user may click on a link/file that the user desires to purchase. The file includes an associated cookie which is used to point the request to the MediaTag application. The application makes a request of the cookie which has been stored on the user's machine by the website providing the music download; MediaTag then takes the cookie, explodes it, and carries out computational activity against the results. The edge server then upon receiving the request interprets the tag and identifies a compute platform which is capable of spinning-up resources for the MediaTag application. Alternatively, the determination may be based solely on geography—the closest POP with resources; there is sometimes a tradeoff between locality and capacity—as a system may choose to actually go to a more distant compute resource to carry out the request because the latency of serving the response is actually less than the latency caused in the local edge by the lack of capacity.

Then, the compute platform spins-up a container running the MediaTag application. The MediaTag application then creates a unique file based on the request (the file may include identification information, such as the username of the requester, the origination location, etc.). Again, alternatively, the choice may be based on both proximity and the current utilization level of that current proximal location; there is a tradeoff. Then, a response to the request is sent to the user (process block 345).

This entire process is implemented using the edge-based cloud computing solution of the present invention. At each step of the execution of the MediTag application, resources and servers are chosen based on their physical proximity to the requesting user device, thus increasing the efficiency and executing time of the MediaTag application. Other applications may be implemented in the same or similar way utilizing method 300.

In some instances, the application/service identified for processing the request at block 315 may be influenced by a version of the application, data or service that is to be sent to the requesting user device. In some instances, the identified application/service identified for processing the request at block 315 influences a version of the application, data or service that is to be sent to the requesting user device. Thus, some embodiments of the invention relate to selecting a version of an application, data (e.g., content object) or service) from amongst a plurality of versions in response to a request received from a user device. A version may be selected, e.g., by a technique disclosed herein and/or by a technique disclosed in U.S. application Ser. No. 12/756,956, which is hereby incorporated by reference in its entirety.

An advantage of edge-based cloud computing may be that requests are able to be routed using URLs. URLs uniquely allow for information to be appended to the URL which can provide the necessary information to the edge server for more efficient routing, resource allocation, and version selection. In addition, URL-based routing enables a variety of systems (e.g., anything capable of dealing with HTTP) the ability to forward the request along. This makes for a very flexible application architecture and a distributed computing environment in that individual application components, all making URL (i.e., HTTP-based) requests, can be completed from different compute resources, not necessarily all the same resource—the resources used for these requests can be fanned out. Further, the compute resources (individually or collectively) may be able to differentially respond to requests associated with a single user-selected URL, by thereafter selecting a version of a requested item (e.g., application, content object, etc.) and returning the selected version to the user device. In one instance, a version may first be selected and a compute resource thereafter chosen based on the selected version. In one instance, a compute resource is selected and a version thereafter selected.

Figure 4:
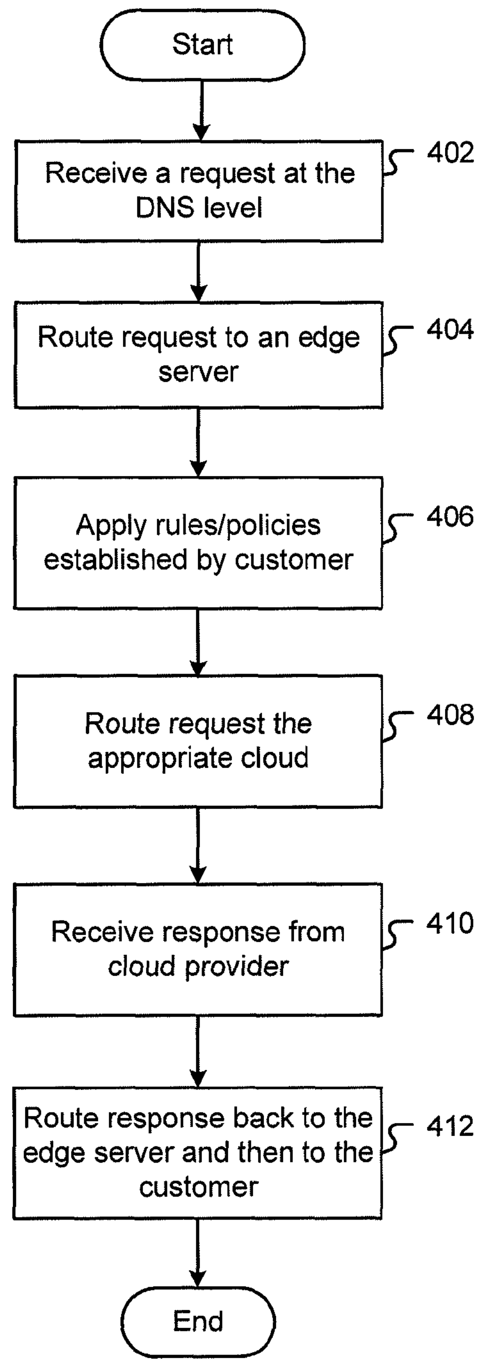
FIG. 4 shows a method of implementing dynamic route requests for multiple clouds.

One embodiment of the present invention may provide that a customer signs up for a "multi-cloud application deployment" which entails provisioning for a content delivery network (CDN) account (i.e., providing HTTP service or the like), as well as enabling the customer access to a portal (or other web-based UI) that allows the customer to specify the cloud-based locations of their applications, the URLs to those applications, the business rules the customer wants the applications to follow when shuttling requests to different clouds, etc. Each cloud that the customer specifies may require a unique hostname provided by the CDN Turning to FIG. 4, a method 400 is illustrated in accordance with embodiments of the present invention. At process block 402, a request for an (e.g., cloud-based) application, data or service may be received at the DNS level. In response, the request may be routed to an edge server or the like (process block 404). At the edge server, the customer rules/policies may be applied to the incoming request (process block 406). As such, as discussed above, requests can be routed to a preferential cloud computing network and/or a version from amongst a plurality of versions of the requested application, data service may be selected. The request is then routed to that cloud computing network (process block 408).

At process block 410, a response is received from the cloud computing network. In one embodiment, response time and other metrics may be collected and recorded for assisting in making future routing decisions. Then, the response may be routed back to the edge server and on to the requesting customer (process block 412).

Figure 5:
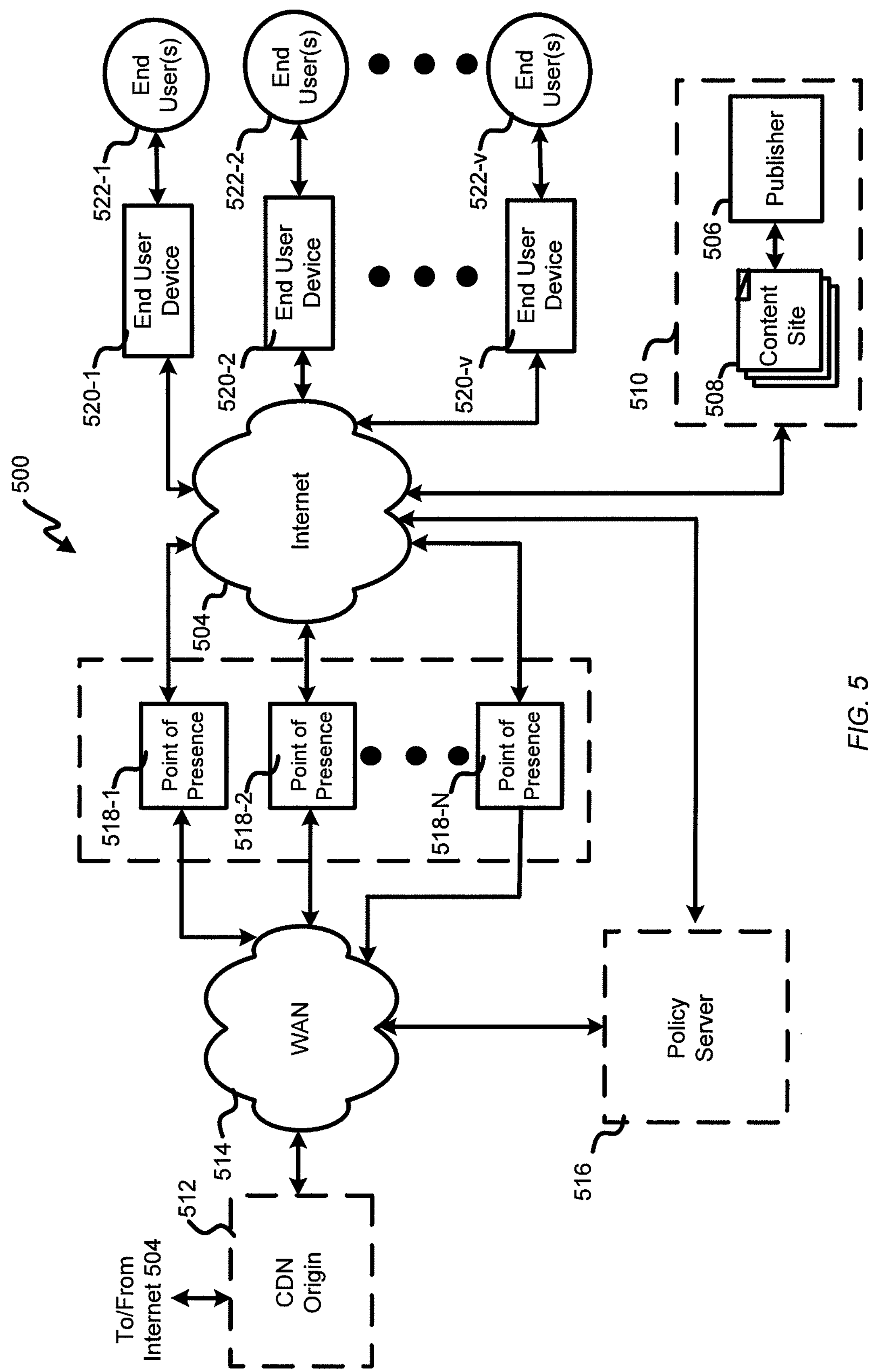
FIG. 5 shows an embodiment of a content distribution system.

Referring first to FIG. 5, a block diagram of an embodiment of a content distribution system 500 is shown in which a content originator 510 offloads delivery of content objects to a content delivery network (CDN). The content originator 510 produces and/or distributes the content objects and may include one or more publishers 506 and content sites 508. The CDN delivers the content objects over the Internet 504 to end users 522 via corresponding end user devices 520.

As shown, the CDN may include an origin server 512, a policy server 516, and various points of presence (PoPs) 518. PoPs 518 can be deployed throughout content distribution system 500 and may serve content objects to end user devices 520 in a particular geographic area and/or in connection with a particular service provider. For example, a PoP 518 may be designated to serve content objects over Internet 504 to end users 522 in a particular city, on a particular access network, etc. to promote efficient delivery and a good user experience.

The various CDN elements may be connected by a private network such as WAN 514 and/or a public network such as Internet 504.

An end user 522 may browse for content objects at a content site 508 with its respective end user device 520. As used herein, a content object can be any computer-accessible content and may include audio data, video data, images, etc. in any number of computer-accessible formats. The terms content and content object may be used interchangeably wherever they appear. End user devices 520 can include personal computers, media players, handheld computers, Internet appliances, smart phones, personal digital assistants, streaming radios, or any other device that receives and processes content objects. The content site 508 could be a web page from which content is accessible via a web browser.

Links to content at the content site 508 may point to locations in the content delivery network. When an end user requests delivery of a particular content object, the request may be assigned to a PoP 518 which, in turn, can deliver the requested content object to the end user device 520. If the content object is not available at the assigned PoP location, the request may be propagated toward the core of the CDN and may ultimately be fulfilled from origin server 512. Content may be cached at various points between the core CDN and edge locations to improve efficiency.

Distribution of content objects often represents an important source of revenue for publishers 506. For example, content sites 508 may generate advertising revenue based on the number of times that a content object is viewed, clicked, or downloaded by end users 522. Thus, to maximize their revenue, publishers 506 may seek to reach as many end users 522 with their content as possible while providing a good overall user experience.

Unfortunately, end user devices 520 can vary widely in their respective capabilities and the manner in which they interact with content objects. Different end user devices 520 may support different collections of multimedia formats and different delivery schemes. For example, beginning with OS version 3.0, the iPhone™ from Apple, Inc. supports M3U8 playlists and MPEG-2 segmented video with iPhone™ HTTP Streaming (IHS) delivery, entirely over HTTP (Hypertext Transfer Protocol). On the other hand, the Blackberry Storm™ from Research in Motion, Ltd. supports playback of multimedia content in Third Generation Partnership Project (3GPP) format, over RTSP (Real-Time Streaming Protocol).

To further complicate matters, the manner in which delivery of a content object is initiated may vary from device to device. For example, some end user devices 520 may need help orchestrating a browser-to-player (B2P) handoff for certain types of content objects. Moreover, even when media formats and delivery methods are equally supported, the manner in which a content object is delivered may depend on the type of connection to Internet 504 available to the end user device 520 at a particular place and time. Thus, for example, the playback capabilities of the Blackberry Storm™ may differ depending upon whether it is connected to the Internet 504 via a WIFI connection in a cybercafé, or via a cellular network in a remote location.

In the present embodiment, policy server 516 is coupled to content site 508 via Internet 504 and receives a notification when new content objects are available from publishers 506. Alternatively, a publisher 506 may upload its content to an origin server 512 and policy server 516 may receive notifications via WAN 514 when a new content object becomes available. Although shown separately, policy server 516 may be located within PoPs 518, origin server 512, or other parts of the content delivery network. Also, it will be recognized that the various operations of policy server 516 may be carried out by multiple individual servers such as decisioning servers, merge servers, assembly servers, etc.

When a new content object is ready for processing, policy server 516 determines how it should be made available to end users. This may involve generating a number of different versions of the content object optimized for use with different end user devices 520, having different capabilities, and potentially used in different network environments. The different versions of the content object may correspond to different production or encoding profiles maintained at policy server 516. The production profiles, in turn, may be based upon a publisher's requirements for the distribution of its content objects. For example, a publisher may prefer to distribute its content in a specific media format or formats, to exploit device-specific capabilities (such as IHS streaming for iPhones), to optimize separately for high bitrate and low bitrate environments, to target specific operating systems and/or platforms such as Windows™ or Mac OS, etc.

Policy server 516 may associate the different versions of a content object with a single network identifier such as a uniform resource locator (URL). The single network identifier can then be returned to the publisher 506 which created the content. The publisher 506 can add the network identifier to one or more content sites 508 which are accessible to end users 522. When a request for the content object is received from an end user device 520, it can be sent to policy server 516 for analysis. Using all available information, policy server 516 can select a version from amongst a plurality of versions of the content object for the end user device 520 and can orchestrate its delivery to the requesting end user. The version and delivery method can be selected based on and/or customized for hardware and software capabilities of the end user device 520, bandwidth and connection quality, viewing habits, user preferences, or any combination of factors. The selected version may also include a selection of advertisements which are matched to information about the end user device and/or the end user.

As described herein, policy server 516 provides publishers 506 with a one-to-many approach to optimized content delivery. Specifically, a single network identifier can point to multiple versions of a given content object from which policy server 516 selects a version for use with a particular end user device. Policy server 516 thus relieves publishers 506 of the burden of staying up-to-date with technology. When a new platform emerges or device capabilities change, appropriate versions of the content object can be made available to end users 522 through an existing network identifier without further effort from the publisher 506. Policy server 516 selects a version of a content object in a manner that is transparent to the end user and thus avoids complicated configuration, specialized software, or manual selection. The end user experience is further improved by selecting a delivery method and sending the selected version of the content object from a PoP 518 location with a fast response time for the user's location, network access, etc.

Figure 6:
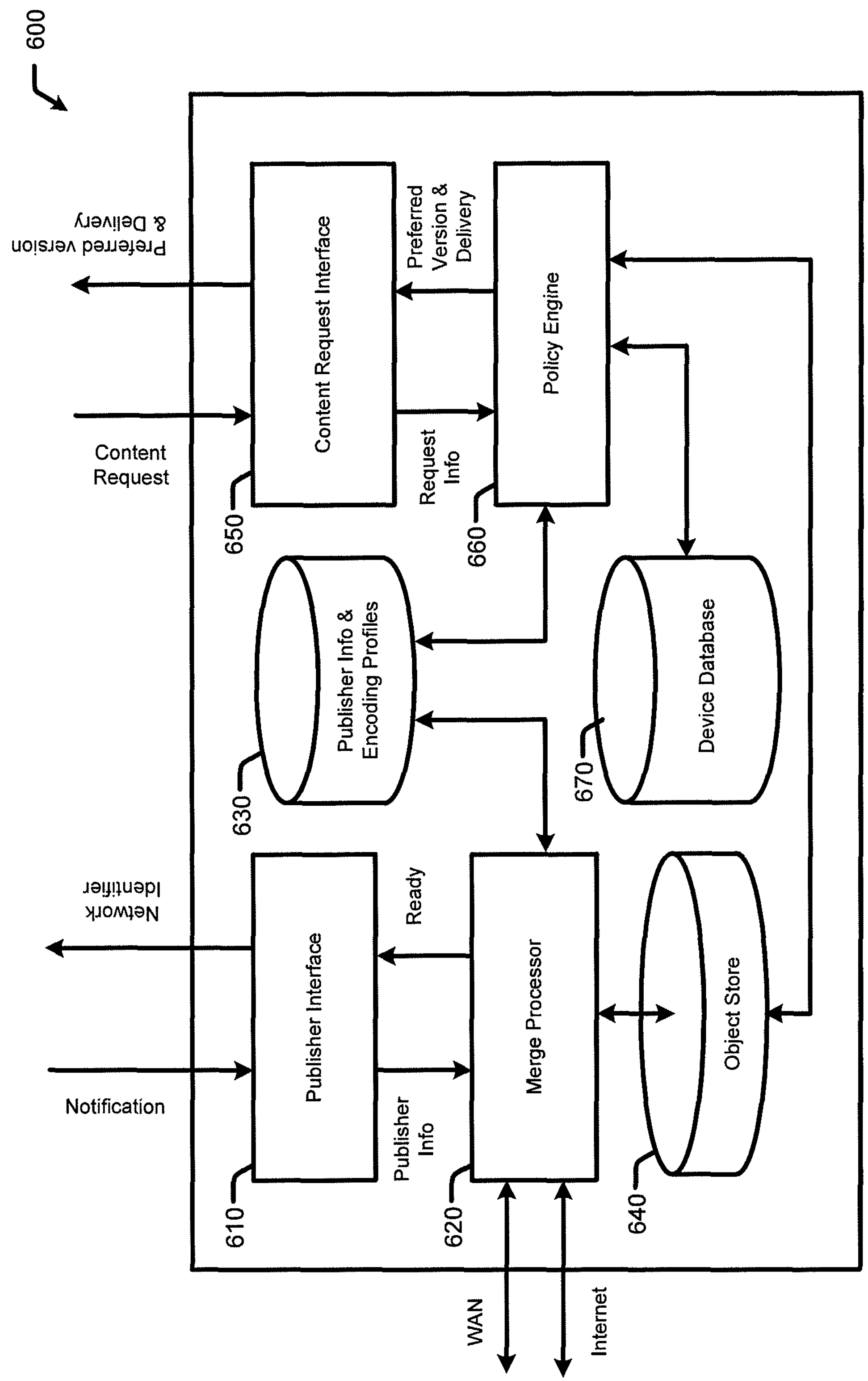
FIG. 6 shows an embodiment of a policy server.

FIG. 6 shows one embodiment of a policy server 600. The present embodiment can be as described in connection with policy server 516 and may be situated within a POP 518, an origin server 512, or at some other location within the content distribution system 500 of FIG. 5. Policy server 600 may include one or more hardware processors. In various embodiments, policy server 600 also includes computer-readable media having encoded thereon data elements and program instructions which, when executed by the one or more processors, cause the policy server 600 to carry the operations described herein.

Figure 12:
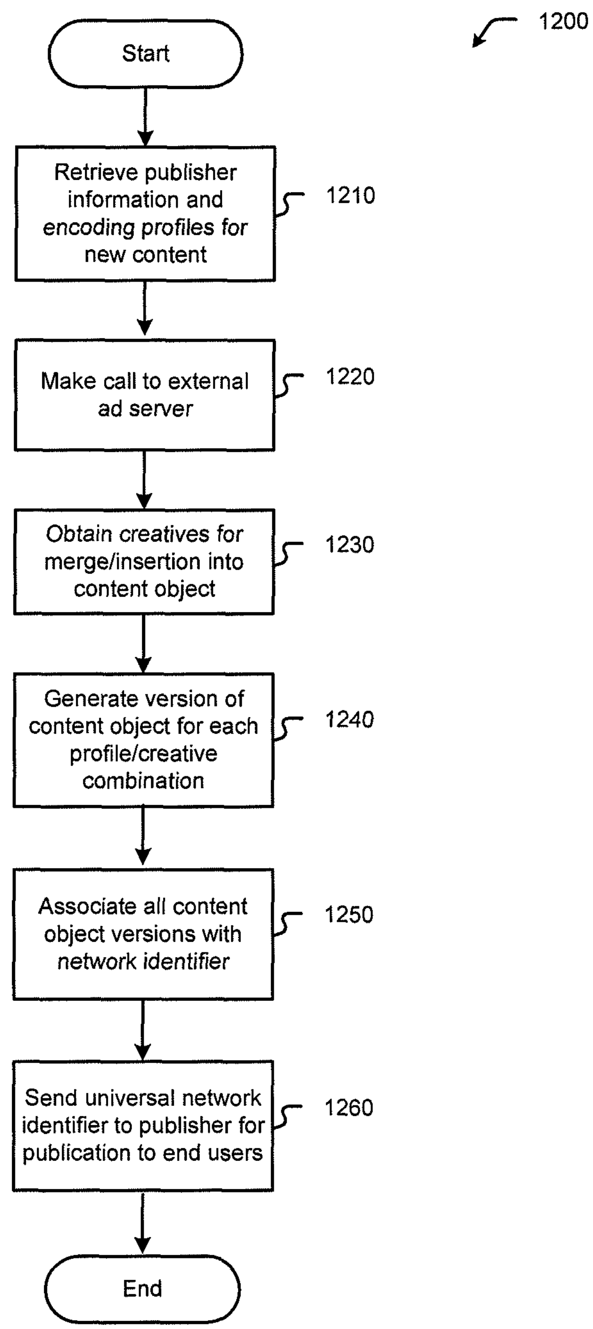
FIG. 12 shows an exemplary ingest process.
Figure 13:
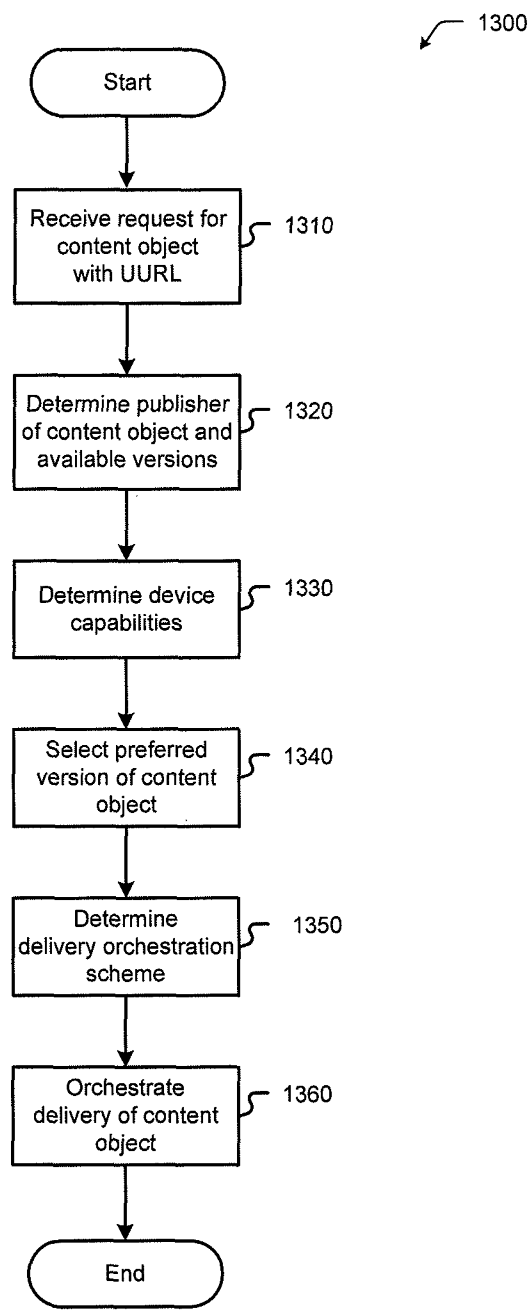
FIG. 13 shows an exemplary delivery process.

FIGS. 7, 8, 9, and 10 illustrate some exemplary data elements such as may be tangibly recorded on computer readable media accessible to policy server 600. FIGS. 12-13 depict exemplary processes such as may be carried out by the one or more processors of policy server 600 executing program instructions stored on such computer-readable media. Computer readable media suitable for storing the data and program instructions may include magnetic storage media including hard disk drives, optical storage media including optical discs, solid state storage including flash-memory devices, and the like.

A publisher interface 610 of policy server 600 receives notification that a content object is available for processing. The notification can be any type of network communication and may be received directly from a publisher or from a CDN location. For example, a publisher 506 may use an RSS (Really Simple Syndication) feed to signal that new content objects are available for processing. Alternatively, the notification may be an event such as an AMQP (Advanced Message Queuing Protocol) message received over WAN 514 when new content is added to a file system of origin server 512, or other type of network communication.

When a notification is received, publisher interface 610 can provide information about the publisher and the content object to a merge processor 620. Merge processor 620 retrieves the content object over Internet 504 or wide area network 514 and is configured to create a plurality of versions of the content object. Creating versions of the content object can involve one or more transcoding, converting, splicing, truncating, padding, reformatting, resampling, repackaging, and related operations which may alter the media format and/or other attributes of the content object as originally created by the publisher 506.

Merge processor 620 can create different versions of the content object according to the requirements of each publisher 506. In one embodiment, merge processor 620 determines a set of production profiles with which to create the versions based on information received at publisher interface 610 or maintained at policy server 600. For instance, publishers 506 may specify various encoding parameters for use in creating the different versions of their content. The encoding parameters may be fashioned into profiles and stored at policy server 600.

FIG. 7 shows exemplary publisher data such as can be included in a publisher/profile database 630 of policy server 600. As shown, the publisher data maps various encoding profiles and advertising information to content sites 508. For instance, at the publisher level, Company A may require different encoding profiles and advertisements for use with its content objects than does Company B. In addition, at the site level, Company A may wish to provide the content from its news operations in different media formats and with different advertising material than content from its sports operations.

Using information from publisher interface 610, merge processor 620 may retrieve one or more publisher-specific and/or site-specific entries from database 630 with which to process content objects. In addition, merge processor 620 may make calls to an external entity to obtain advertising material ("creatives") for inclusion with the different versions of the content object based on advertising index values or other indicators. For example, merge processor 620 may be configured to make advertising calls over Internet 504 or WAN 514 to a hosted ad serving platform such as the DART for Publishers service from Google, Inc. or the Atlas AdManager service from Microsoft Corporation. The advertising calls may include additional publisher-specific indices or category information for matching the creatives to particular content.

FIG. 8 shows exemplary profile information such as can be included in database 630. As shown, each profile includes a collection of information with which to create versions of the content object. For example, among other things, each profile may include a codec, a container type, a frame size, a bit rate, a color depth, an audio format, etc. These and other parameters may be optimized for use by different end user devices 520 under different operating conditions. Collections of encoding profiles can be matched to the capabilities of different end user devices 520 and/or different operating conditions. For example, profiles may be organized in database 630 into collections of iPhone profiles, Blackberry profiles, high-bandwidth profiles, low-bandwidth profiles, etc. Database 630 may also include one or more profiles which are representative of a lowest common denominator (LCD) of the end user devices 520 or of a particular category of end user devices, such as a generic mobile device profile.

When encoding profiles for a content object have been identified and the creatives are ready, merge processor 620 produces a plurality of versions of the content object. This can involve inserting creatives at different positions in the content object and generating versions of the content object having different combinations of creatives for each encoding profile. In some embodiments, a plurality of merge resources work in parallel to create versions of the content object for each profile-creative combination. For example, merge processor 620 may direct the operation of a server farm or cluster of computing resources in the large scale production of versions of the content object. As they become available, the content object versions may be placed into an object store 640 and readied for distribution to locations throughout the CDN.

Merge processor 620 associates each version of the content object with a single network identifier and, when processing of the content object is complete, may signal to publisher interface 610 that the network identifier is ready for distribution. Policy server 600 may then transmit the network identifier to publishers 506 for use at content sites 508. As described below, information about the network identifier is maintained in database 630 and used by a policy engine 660 to select a version (e.g., a preferred version) of the content object for distribution to an end user system.

FIG. 9 shows exemplary network identifiers such as may be created by merge processor 620 and stored in database 630. Here, the network identifiers are universal-URLs (UURL). A universal-URL is a single URL that is associated with all versions of the content object available for distribution to end user devices. For example, all versions of the content object "homerun.mpg" (which may include versions created using encoding profiles E1, E2, and E3 with different combinations of creatives) are referenced by the single network identifier "http://company.x/sports/homerun.mpg." The various versions of content object "interview.mov" are referenced by network identifier "http://company.x/news/interview.mov," and so on.

When an end user 522 requests delivery of a content object using its UURL, the request may be redirected to policy server 600 for selecting a version (e.g., a preferred version) of the requested content object from the available versions and for orchestrating delivery of the selected version to the end user device. For example, the content request may be received at a POP 518 location in the CDN and redirected to policy server 600 using HTTP redirects. CDN elements may also forward information relating to the request ("request information") with the UURL for use by policy server 600.

Request information may include cookies, usage statistics, user profiles, hardware identifiers, software identifiers, demographics information, viewing habits, content preferences, group memberships, etc. The content request interface 650 receives the request information and passes it along with the UURL to a policy engine 660.

Policy engine 660 is responsible for understanding the content and determining how to orchestrate a response to ensure its proper delivery to the requesting end user device. Using the network identifier, policy engine 660 can retrieve information from database 630 about the publisher of the requested object, the versions of the content object available for delivery through the CDN, and their corresponding encoding profiles and creatives. Using the request information, policy engine 660 can select a version (e.g., a preferred version) of the content object for the end user device and can determine an appropriate delivery scheme.

The request information may include a user-agent associated with the end user device. The user agent, for example, may include one or more hardware and/or software identifiers corresponding to device capabilities. For purposes of illustration, two examples of user agent information are provided below.

(1) BlackBerry9530/4.7.0.148 Profile/MIDP-2.0 Configuration/CLDC-1.1 VendorID/105

(2) Mozilla/5.0 (iPhone; U; CPU iPhone OS 3_0_1 like Mac OS X; en-us) AppleWebKit/525.18.1 (KHTML, like Gecko) Mobile/5H11

The first example (1) shows user agent information for a Blackberry mobile phone. The device is identified as a Model 9530 running version 4.7.0.148 of the browser software. The user-agent information also indicates that the device supports Java application programming interfaces (CLDC-1.1) and includes a Vendor string (VendorID/105) indicating that "Verizon US" is the wireless provider. The second example (2) shows user-agent information for an iPhone. The hardware is identified as an iPhone mobile device with firmware version 5H11. Software capabilities indicate the iPhone is running version 3.0.1 of the iPhone OS, with build 525.18.1 of Apple Webkit core classes and a Mozilla-based browser.

In addition to user-agent information, policy engine 660 may also receive metadata, cookies, profiles, or other device/user information from content request interface 650. Cookies and metadata, for example, may be forwarded to policy server 600 from the CDN server where the request was received and may contain indications of user preference for one media format or another, viewing history, etc. Based on the totality of available information, policy engine 660 determines or selects a version (e.g., a preferred version) of the content object and an orchestration scheme for arranging its delivery to the requesting end user device.

FIG. 10 shows exemplary device information such as may be included in device database 670 and used by policy engine 660 to determine or select a version (e.g., a preferred version) and delivery orchestration scheme for responding to a content request. Device database 670 can include extensive details of hardware and software capabilities corresponding to a number of end user devices. For example, as shown, the device capabilities information can include processor, display screen, operating system, codec, protocol, and B2P handover information for each device. Information for populating device database 670 may be obtained directly from manufacturers and deduced from publicly available sources and may be updated as new devices and technologies appear in the marketplace.

Using the publisher information (FIG. 6) in combination with network identifier information (FIG. 8), and device capabilities information (FIG. 9), policy engine 660 can determine or select a version (e.g., a preferred version) of a requested content object from among the available versions. For example, if a user requests UURL "http://company.x/sports/homerun.mpg," policy engine 660 may determine that the requested object is an asset of Company X and that three versions (E1, E2, E3) of the content object are available for distribution through the CDN. Policy engine 660 can then cross-reference device capabilities with the encoding profiles to identify a subset of the available versions best suited for use with the requesting end-user device. The subset of versions can then be ranked in accordance with the request information and publisher requirements to identify a particular version (e.g., a preferred version) based on the best information available.

In the "homerun.mpg" example, if the user-agent information indicates that the end user device is an iPhone™, the selected version may correspond to encoding profile E1 since that profile matches the 480×360 native resolution of the iPhone™ device and includes a (segmented) MPEG-2 video format. Since the requesting device has identified itself as an iPhone™, policy engine 660 could select an HPD delivery orchestration scheme. However, because it is known that the requesting iPhone™ is also running OS 3.x, the device capabilities information indicates that iPhone™ HTTP Streaming (IHS) is also available.

IHS delivery may be selected by the publisher, it may match the end user's preferences, or it may represent the default orchestration scheme for iPhones running OS 3.x. Continuing with the example, policy engine 660 may select a version of "homerun.mpg" one that is created with encoding profile E1 and that includes a selection of creatives based on the request information. Note that the version of the content object selected and the delivery orchestration scheme may change based on the hardware and software capabilities of the requesting device. For example, if an iPhone™ is detected as running version 2.x of the Apple operating system, policy engine 660 may instead choose HPD orchestration and a version of the content object having an MPEG-4 video format.

Of course, many variations are possible in determining or selecting a version and delivery orchestration scheme. For example, the request information may include a type of connection for the end user device. The type of connection may be determined based on information received from the end user device, based on an IP address of the end user device, based on an entry point to the CDN, or any other means and may influence orchestration and the selection of the version. In a simple case, the type of network connection may be used to choose between high bit rate and low bit rate versions of the content object. Cookies and metadata included with the request information may also influence selection of the version of the content object. For example, cookies may provide an indication of user preference for media formats, bit rates, playback software, etc.

In some embodiments, policy engine 660 may determine or select a version (e.g., a preferred version) of the content object according to a hierarchy of information. For example, in descending order of priority, the hierarchy may include user preferences, special hardware capabilities, general hardware capabilities, special software capabilities, general software capabilities, and default settings. Policy engine 660 may perform a series of comparisons using available information and a predetermined order of precedence by which to identify the version of the content object.

As one example, a user's preference for MOV media format with a QuickTime media player may take precedence over generalized software capabilities and default settings. Similarly, versions of a content object which exploit special hardware capabilities, such as high resolution display screens, may be preferred to versions compatible with more general hardware capabilities; specialized software capabilities (such as IHS streaming support) may take precedence over default HTTP delivery, and so on. Operation of policy engine 660 is not limited to a particular set of information, but may utilize any combination of user, publisher, network, encoding profile, and device capabilities information by which to select a particular content version and by which to orchestrate its delivery to the end user.

Figure 11:
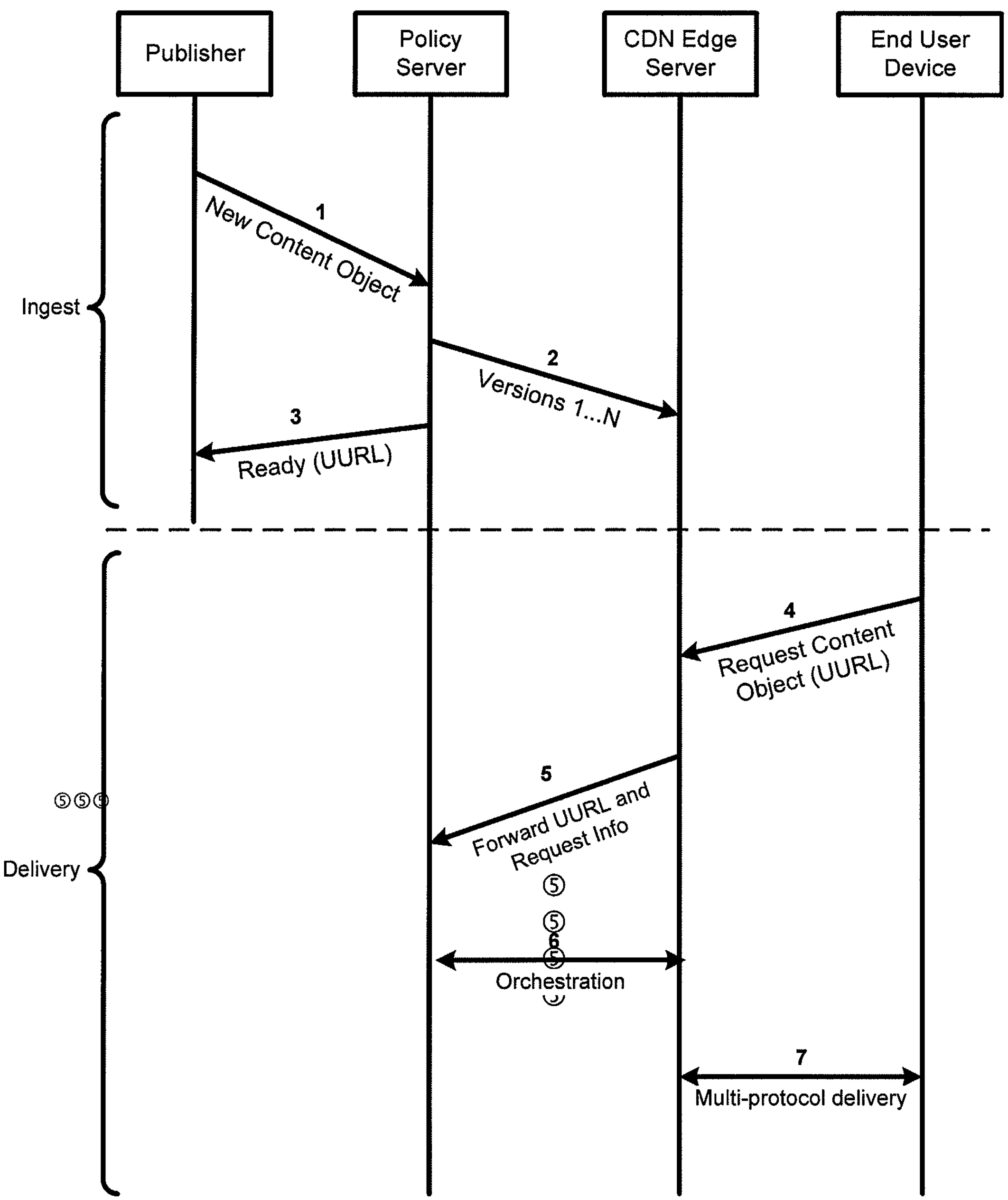
FIG. 11 shows an interaction between elements of a content distribution system.

FIG. 11 shows an exemplary interaction among elements of a content distribution system including a publisher, a policy server, a CDN edge server, and an end user device. The elements participating in exemplary interaction may be as described in connection with the content distribution system 500 of FIG. 5, including the policy server 600 of FIG. 6. For purposes of discussion, the interaction is divided into an ingest part (arrows 1-3) and a delivery part (items 4-6). The ingest part of the interaction begins at arrow (1) when the policy server receives notification of a new content object and is now described in connection with FIG. 8.

FIG. 12 shows an exemplary ingest process 1200 such as may be performed by policy server 600 at this stage of the interaction. Some or all of ingest process 1200 may be performed by one or more processors executing fixed or programmable instructions which, in turn, may be stored with related data elements on a computer-readable medium.

At block 1210, the policy server retrieves publisher information and encoding profiles for the new content object. The publisher information may be similar to that described in connection with FIG. 7 and may specify a set of encoding profiles and advertising identifiers such as shown in FIG. 8 for processing the media assets of a particular content site.

At block 1220, the policy server uses the advertising identifiers to communicate with ad servers. For instance, the policy server may transmit the advertising identifiers and other information specific to the content site to one or more ad servers using their respective application programming interfaces (API). Based on the responses from the ad servers, at block 1230, creatives are obtained for inclusion with new versions of the content object. With audio and video content, the response to the ad call may also include information to guide placement of the creatives within the content object. For example, different types of creatives may be designated for insertion at pre-roll, mid-roll, and post-roll positions in the content object received from the publisher.

At block 1240, the policy server generates, or causes to be generated, a plurality of versions (1 . . . N) of the content object. The versions may be created by transcoding, converting, merging, splitting, truncating, padding, resampling, resizing, reformatting, repackaging, filtering, and otherwise transforming and possibly modifying the original content object according to the collection of encoding profiles associated with publisher and content site. During processing, advertising material can be inserted or merged into each version of the content object at the specified positions and, for each encoding profile, versions may be created using different combinations of advertising material. Note that the N versions of the content object may be created in a parallel fashion and that processing may be distributed across a collection of merge computing resources to minimize the time to completion.

At block 1250, the policy server associates the N versions of the content object with a single network identifier. The network identifier can be, for example, a universal URL (UURL) as described in connection with FIG. 9, or other identifier having a one-to-many relationship to the versions of the content object. When the versions of the content object are ready, at block 1260, the policy server may distribute them to locations in the CDN such as origin servers 512 or, in some cases, to various POP locations as shown by arrow (2). The ingest part ends when the policy server returns the network identifier to the publisher for inclusion on its content sites as shown with arrow (3). However, additional versions of the content object may be generated as new hardware and software capabilities emerge or when a publisher's requirements change. Because the additional versions are associated at the policy server with a previously published network identifier, updates to the respective content sites are not required.

The delivery part of the interaction begins with arrow (4) when the end user device requests a content object using the network identifier (UURL) and is now described in connection with FIG. 13.

FIG. 13 shows an exemplary delivery process 1300 such as may be performed by policy server 600. Some or all of delivery process 1300 may be performed by one or more processors executing fixed or programmable instructions which, in turn, may be stored with related data elements on computer-readable media.

At block 1310, a request for a content object with a UURL is received. For example, with a UURL, an end user may click on a link at a publisher's web site and be redirected to a nearby CDN location. This can be accomplished through DNS resolution or in some other manner. As shown using arrow (5), the CDN location may forward the content request along with any related information such as the IP address of the end user device, hardware and software identifiers, usage statistics, cookies, metadata, profiles, etc. to the policy server for selection of a version of the requested content.

At block 1320, the policy server identifies versions of the content object associated with the UURL. As previously described, a multitude of versions may have been generated during the ingest process and each version may correspond to an encoding profile and a set of creatives. The encoding profiles, in turn, may be optimized for use with different hardware and software platforms under different network conditions, and the creatives may be selected according to the type of content, with different groups of creatives being designated for different target audiences of the content object.

At block 1330, the policy server determines capabilities of the requesting end user device. The capabilities may be determined using device identifiers accompanying the content request or other sources of information available through the CDN. For instance, device information may be retrieved from a device capabilities database with information from a user-agent string, cookies stored on the end user's computer, records of previous interactions with the CDN, etc.

At block 1340, a version (e.g., a preferred version) of the content object is selected based on the various sources of information. As shown by arrow (6), the policy server also determines a delivery orchestration scheme, block 1350, for sending the selected version of the content object to the requesting end user. Both the selected version of the content object and the delivery orchestration scheme selected by the policy server may reflect a ranking of device capabilities, user preferences, publisher requirements, network conditions, and other factors relating to overall user experience of the requested content as these elements are variously described herein.

At block 1360, the policy server orchestrates delivery of the selected version of the content object according to the selected delivery option. As shown by a arrow (7), orchestration may involve multiple delivery protocols. For example, delivery orchestration schemes which may be utilized by the policy server include HTTP progressive download (HPD), RTSP streaming delivery (RSD), RTSP via HTML stub (RSDH), and iPhone HTTP streaming (IHS). As described below in connection with FIG. 10, orchestration may include, for example, coordinating with other elements of the CDN, redirecting an HTTP content request, transitioning from HTTP to RTSP, providing a stub or helper file, providing a master playlist, providing a bandwidth-specific playlist, or other combination of actions.

Figure 14A:
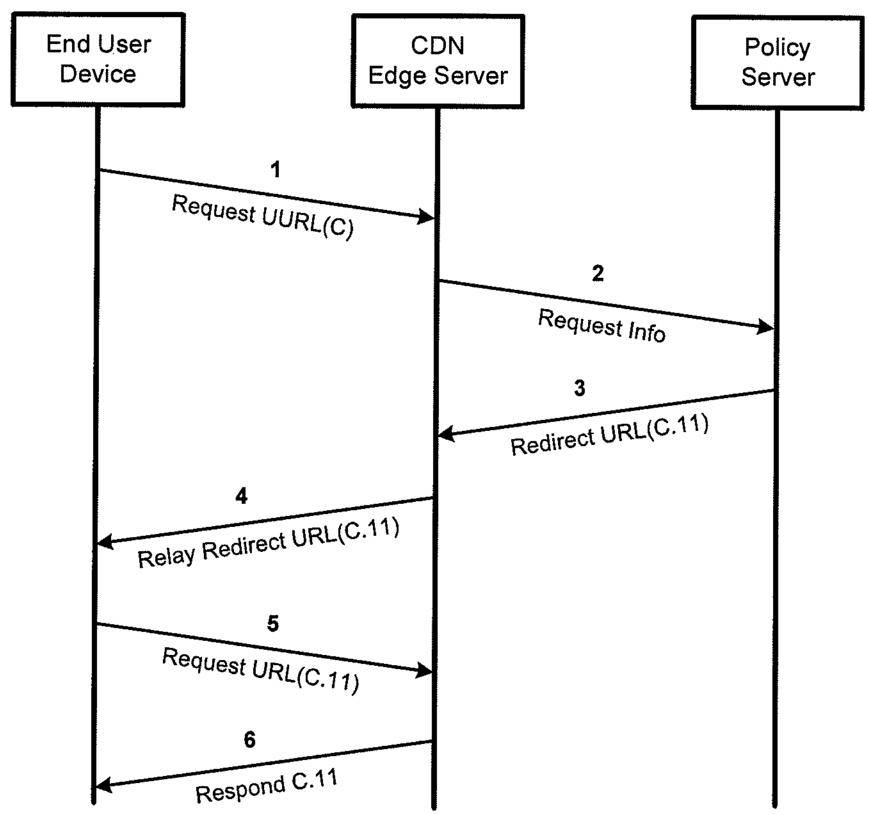
FIG. 14A shows aspects of HPD content delivery.

FIG. 14A shows aspects of an exemplary HPD delivery orchestration scheme involving a policy server, a CDN edge server, and an end user device. The exemplary HPD orchestration scheme may be used by a policy server in the content distribution system 500 of FIG. 5 in response to a request for content.

The interaction begins with arrow (1) when the end user device requests a content object using its universal URL. As shown, the end user device may send an HTTP request for universally-identified content object C. The UURL may resolve to a CDN location that is best able to serve the end user device. At arrow (2), the CDN edge server forwards the HTTP request along with request information such as user profiles, device identifiers, cookies, metadata, network connection, etc. to the policy server.

The policy server processes the UURL request and the additional request information received from the CDN edge server and determines a particular version (C.11) of the content object for delivery to the end user computer. At arrow (3), the policy server generates an HTTP redirect 302 in which information about version C.11 is added to the location header. At arrow (4), the CDN edge server performs a second HTTP redirect to pass the updated location header to the end user device. The end user device makes a second HTTP request at arrow (5) for content object C.11 using the location header information. The CDN edge server responds to the second HTTP request at arrow (6) and delivers the particular C.11 version of the content object. In an alternative embodiment, the exchange shown by arrows (4) and (5) is omitted and the edge server responds directly to the end user device with version C.11 of the content object.

Figure 14B:
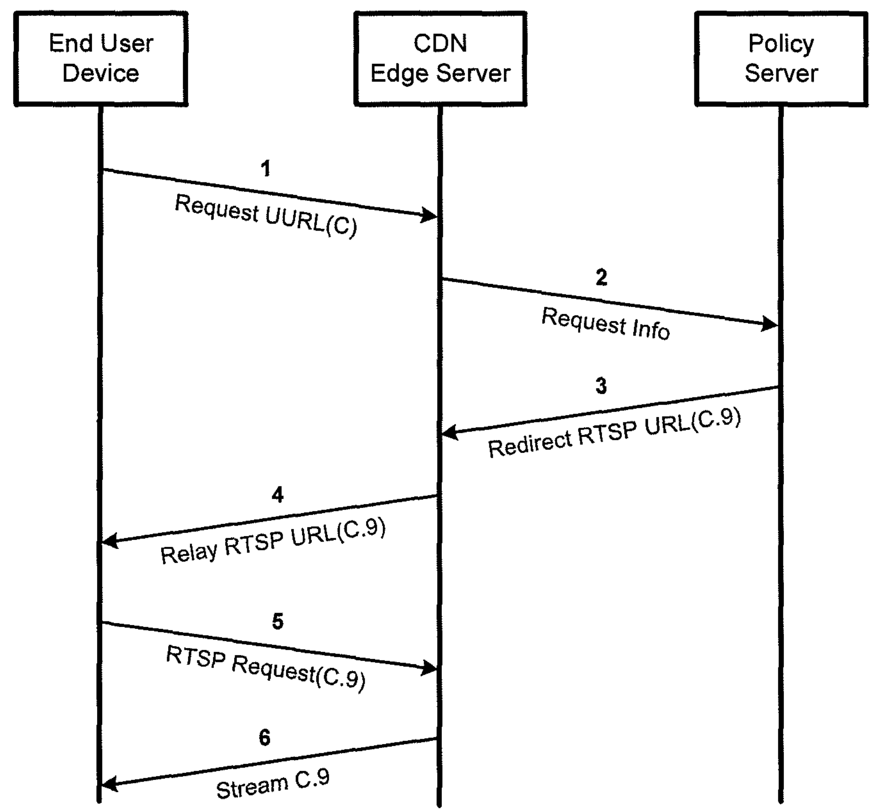
FIG. 14B shows aspects of RSD content delivery.

FIG. 14B shows aspects of an exemplary RSD delivery orchestration scheme involving a policy server, a CDN edge server, and an end user device. The exemplary RSD orchestration scheme may be selected by a policy server in the content distribution system 500 of FIG. 5 in response to a request for content.

The interaction begins with arrow (1) when the end user device requests a content object using its universal URL. As with HPD delivery, the device may send an HTTP request for content object C which may resolve to a CDN point of presence and be assigned to a CDN edge server. At arrow (2), the CDN edge server forwards the HTTP request along with related information such as user profiles, device identifiers, cookies, metadata, connecting network, etc. to the policy server.

The policy server processes the UURL request and any additional information received from the CDN edge server to determine a particular version (C.9) of the content object for delivery to the end user device. In this case, RTSP streaming delivery is selected. The selection of RTSP delivery may be based on user preferences, publisher preferences, software capabilities, or any number of factors.

At arrow (3), the policy server generates an HTTP redirect (302) in which an RTSP URL corresponding to version C.9 is added to the location header. At arrow (4), the CDN edge server performs a further HTTP redirect by which the updated location header is passed to the end user device. At arrow (5), the end user device makes an RTSP request for content object C.9 using header information from the redirected HTTP request. A streaming CDN edge server responds to the RTSP request at arrow (6) and streams version C.9 of the requested content object to the end user device.

Figure 14C:
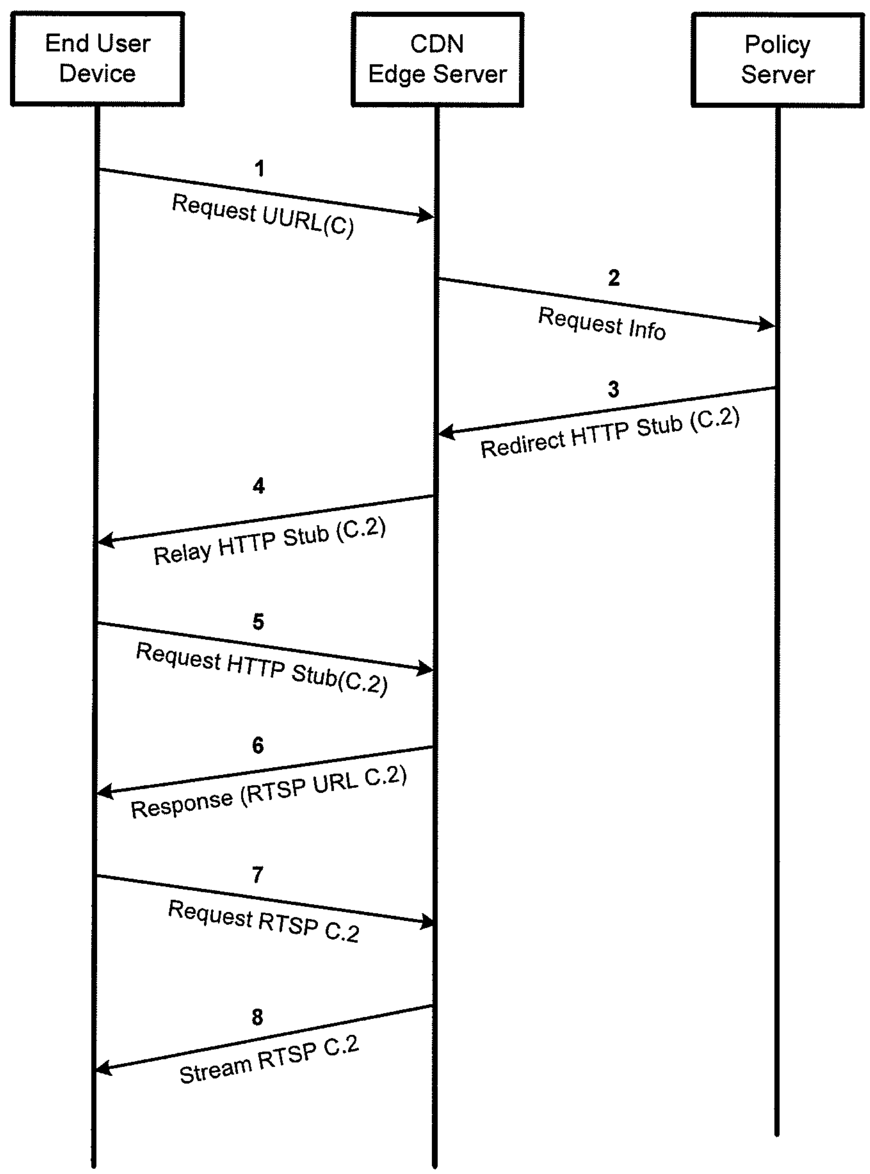
FIG. 14C shows aspects of RSDH content delivery.

FIG. 14C shows aspects of an exemplary RSDH delivery orchestration scheme involving a policy server, a CDN edge server, and an end user device. The exemplary RSDH orchestration scheme may be selected by a policy server in the content distribution system 500 of FIG. 5 in response to a request for content.

The interaction begins with arrow (1) when the end user device requests a content object using its universal URL. The request for content may be an HTTP request which resolves to the address of a CDN edge server. At arrow (2), the CDN edge server forwards the HTTP request along with related information such as user profiles, device identifiers, cookies, metadata, connecting network, etc. to the policy server.

At arrow (3), the policy server generates an HTTP redirect (302) to an HTML stub wrapper. The HTML stub wrapper may include, within its HTML body content, an RTSP URL of the selected version of the content object and certain directives to force the end user device to invoke a media player application. This type of redirection may be used, for example, to facilitate transition of control from a browsing application to a media player environment when the policy server determines that the end user device lacks the appropriate capabilities.

At arrow (4), the CDN edge server relays the HTTP request referencing the HTML stub wrapper to the end user device. At arrow (5), the end user device makes an HTTP request for the HTML stub wrapper. At arrow (6), the CDN edge server fulfills the request and transfers the HTML stub wrapper to the end user device. The HTML stub wrapper contains the RTSP URL for the C.2 version and causes the end user device to invoke its media player application. At arrow (7), responsive to the HTML stub wrapper, the end user device invokes its media player and requests an RTSP stream for C.2. At arrow (8), a streaming CDN edge server responds to the RTSP request and streams version C.2 of the content object to the end user device.

Figure 14D:
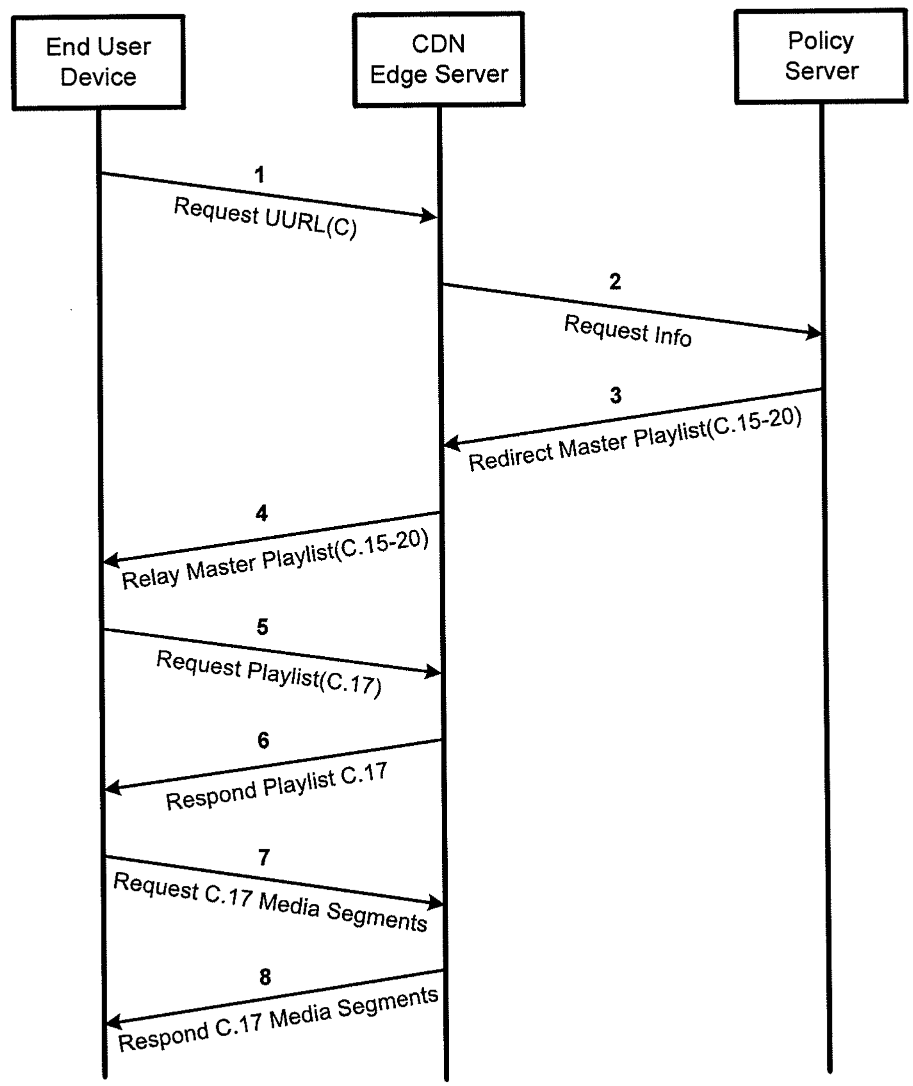
FIG. 14D shows aspects of IHS content delivery.

FIG. 14D shows an exemplary IHS delivery orchestration scheme involving a policy server, a CDN edge server, and an end user device. The exemplary IHS orchestration scheme may be selected by a policy server in the content distribution system 500 of FIG. 5 in response to a request for content.

The interaction begins at arrow (1) when the end user device requests a content object using its universal URL. As with the other delivery methods, the device may send an HTTP request for content object C which is assigned to a CDN edge server through a DNS resolution process. At arrow (2), the CDN edge server forwards the HTTP request along with related information such as user profiles, device identifiers, cookies, metadata, connecting network, etc. to the policy server.

Apple iPhones™ running iPhone OS 3.0 and higher include a built-in Quicktime player which supports streaming video over HTTP using a combination of M3U8 playlists and MPEG-2 segmented video. This approach enables the end user device to select between different versions of a preferred content object (for example, versions with different bitrates) and to switch between the different versions based on how much network bandwidth is available. Due to this flexibility, the policy server may prefer IHS delivery for use with suitable iPhone™ end user devices.

When IHS delivery of preferred content is selected, the policy server generates an HTTP redirect (302) to a master playlist. Here, the master playlist includes references to multiple versions (C.15-C.20) of the preferred content which may, as previously indicated, correspond to multiple bandwidth choices. At arrow (3), the policy server sends the redirected request containing the master playlist to the CDN edge server; at arrow (4), it is returned to the end user device.

At arrow (5), the Quicktime player selects from the master playlist and requests a playlist of media segments corresponding to its selection. In this example, the iPhone™ selects version C.17 from the versions presented in the master playlist and issues a request at item (5) for the C.17 playlist. Version C.17, for example, may represent the highest bandwidth version for prevailing network conditions. At item (6), the CDN edge server responds by providing a playlist for C.17 to the iPhone. Thereafter, during playback of the content, the iPhone requests media segments for C.17 and the CDN edge server delivers the requested segments as is shown by items (7)-(8).

Figure 15:
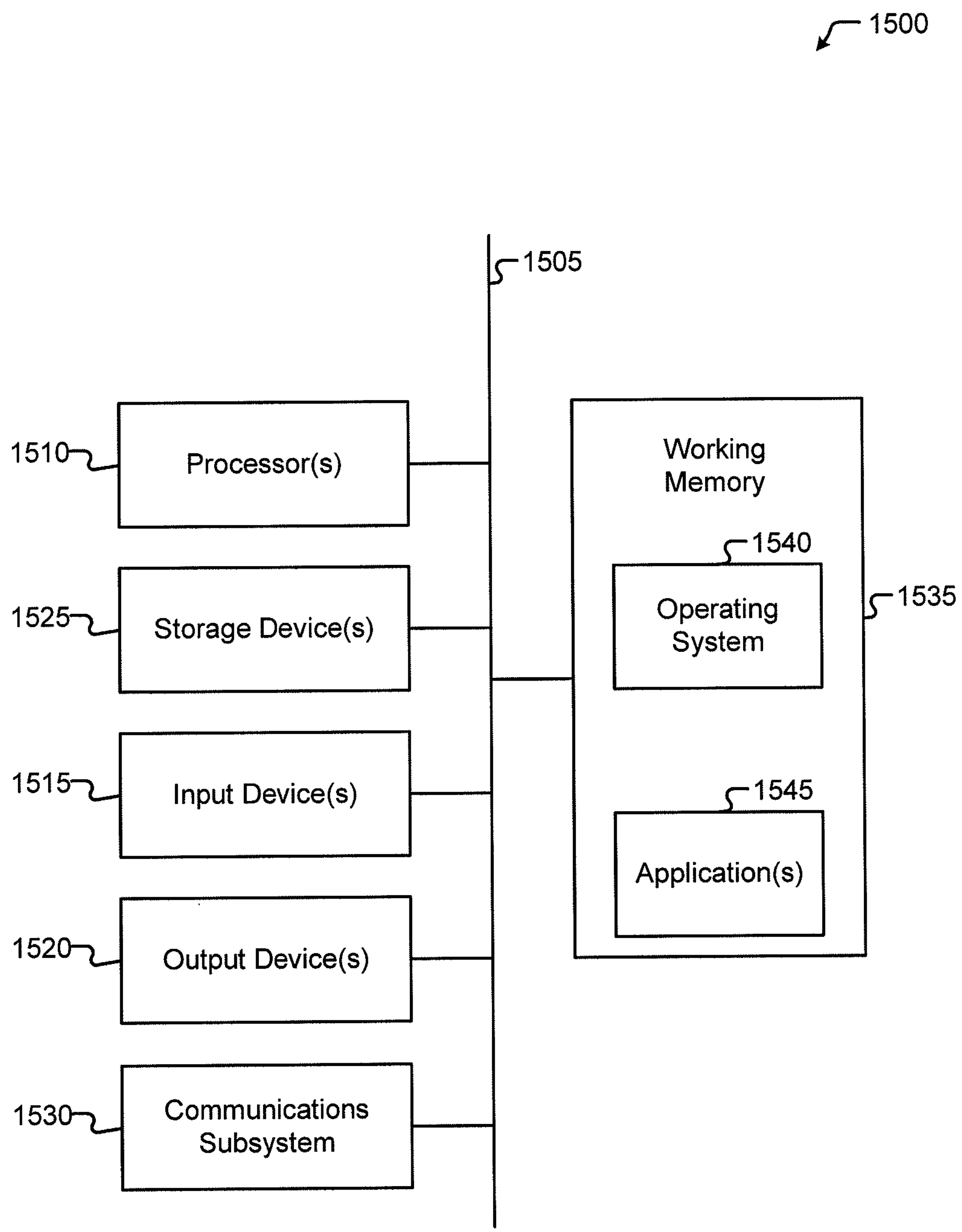
FIG. 15 shows an embodiment of a computer system.

FIG. 15 provides a schematic illustration of one embodiment of a computer system 1500 that can perform the methods of the invention, as described herein. It should be noted that FIG. 15 is meant only to provide a generalized illustration of various components, any or all of which may be utilized as appropriate. FIG. 15, therefore, broadly illustrates how individual system elements may be implemented in a relatively separated or relatively more integrated manner.

The computer system 1500 is shown comprising hardware elements that can be electrically coupled via a bus 1505 (or may otherwise be in communication, as appropriate). The hardware elements can include one or more processors 1510, including without limitation, one or more general purpose processors and/or one or more special purpose processors (such as digital signal processing chips, graphics acceleration chips, and/or the like); one or more input devices 1515, which can include without limitation a mouse, a keyboard and/or the like; and one or more output devices 1520, which can include without limitation a display device, a printer and/or the like.

The computer system 1500 may further include (and/or be in communication with) one or more storage devices 1525, which can comprise, without limitation, local and/or network accessible storage and/or can include, without limitation, a disk drive, a drive array, an optical storage device, a solid state storage device such as a random access memory ("RAM") and/or a read-only memory ("ROM"), which can be programmable, flash updateable and/or the like. The computer system 1500 might also include a communications subsystem 1530, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 1530 may permit data to be exchanged with a network (such as the network described below, to name one example), and/or any other devices described herein. In many embodiments, the computer system 1500 will further comprise a working memory 1535, which can include a RAM or ROM device, as described above.

The computer system 1500 also can comprise software elements, shown as being currently located within the working memory 1535, including an operating system 1540 and/or other code, such as one or more application programs 1545, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 1525 described above. In some cases, the storage medium might be incorporated within a computer system, such as the system 1500. In other embodiments, the storage medium might be separate from a computer system (i.e., a removable medium, such as a compact disc, etc.), and is provided in an installation package, such that the storage medium can be used to program a general purpose computer with the instructions/code stored thereon. These instructions might take the form of executable code, which is executable by the computer system 1500 and/or might take the form of source and/or installable code, which, upon compilation and/or installation on the computer system 1500 (e.g., using any of a variety of generally available compilers, installation programs, compression/decompression utilities, etc.), then takes the form of executable code. In one embodiment, the computer or machine-readable medium may be non-transitory.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 1500) to perform methods of the invention. According to a set of embodiments, some or all of the procedures of such methods are performed by the computer system 1500 in response to processor 1510 executing one or more sequences of one or more instructions (which might be incorporated into the operating system 1540 and/or other code, such as an application program 1545) contained in the working memory 1535. Such instructions may be read into the working memory 1535 from another machine-readable medium, such as one or more of the storage device(s) 1525. Merely by way of example, execution of the sequences of instructions contained in the working memory 1535 might cause the processor(s) 1510 to perform one or more procedures of the methods described herein.

The terms "machine-readable medium" and "computer readable medium," as used herein, refer to any medium that participates in providing data that causes a machine to operate in a specific fashion. In an embodiment implemented using the computer system 1500, various machine-readable media might be involved in providing instructions/code to processor(s) 1510 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media includes, for example, optical or magnetic disks, such as the storage device(s) 1525. Volatile media includes, without limitation, dynamic memory, such as the working memory 1535. Transmission media includes coaxial cables, copper wire and fiber optics, including the wires that comprise the bus 1505, as well as the various components of the communications subsystem 1530 (and/or the media by which the communications subsystem 1530 provides communication with other devices). Hence, transmission media can also take the form of waves (including without limitation radio, acoustic and/or light waves, such as those generated during radio wave and infrared data communications).

Common forms of physical and/or tangible computer-readable media include, for example, a floppy disk, a flexible disk, a hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 1510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1500. These signals, which might be in the form of electromagnetic signals, acoustic signals, optical signals and/or the like, are all examples of carrier waves on which instructions can be encoded, in accordance with various embodiments of the invention.

The communications subsystem 1530 (and/or components thereof) generally will receive the signals, and the bus 1505 then might carry the signals (and/or the data, instructions, etc., carried by the signals) to the working memory 1535, from which the processor(s) 1510 retrieves and executes the instructions. The instructions received by the working memory 1535 may optionally be stored on a storage device 1525 either before or after execution by the processor(s) 1510.

As will be understood by those skilled in the art, the present invention may be embodied in other specific forms. In one particular embodiment of the partial object cache, as previously described, can be associated with a plurality of versions of programming structures. In one particular embodiment of the policy server, a new content object is assigned a single network identifier which, as previously described, can be associated with a plurality of versions of the content object. However, the versions of the content object need not be created prior to receiving a request from an end-user device. Instead, the different versions of the content object may be created dynamically at the direction of the policy server when a request is received. As described herein, the full set of available information (user-agent, preferences, network identifiers, cookies, metadata, usage information, etc) can be utilized to generate a particular (e.g., a preferred) version of the content object for the requesting end-user device. As part of this on-demand process, the newly created particular version of the content object is associated with the single network identifier previously assigned to the new content object and it may be placed into an object store and used with subsequent requests. Those skilled in the art will recognize, or be able to ascertain using no more than routine experimentation, many equivalents to the specific embodiments of the invention described herein. Such equivalents are intended to be encompassed by the following claims.

What is claimed is:

1. A method of virtualizing request-responding resources, the method comprising:

determining an edge server from a plurality of edge servers within a cloud to use to communicate with an end-user device based on an efficiency threshold, wherein: the edge server is within a first point of presence (POP) of a plurality of POPs: the plurality of POPs are part of a content delivery network~ and the plurality of POPs are distributed geographically; receiving, at the determined edge server, a routed service request from the end-user device, wherein the service request includes identification information; based at least partly on the identification information, determining an application used to process the service request; forwarding the service request to a functioning compute platform operating over a network in communication with the determined edge server, wherein: the compute platform contains instructions for running a plurality of applications; the plurality of applications comprise the application; and the plurality of applications are not running on the compute platform before the service request from the end-user device is received; based at least partly on the identification information, identifying a version of requested service from amongst a plurality of versions after receiving the service request, wherein each of the plurality of versions is created prior to receiving any request for the content object; instantiating, at the compute platform, a virtual container, wherein the virtual container includes one or more resources and the application used to process the service request, wherein the instantiating occurs after the service request from the end-user device is received and includes the functionality of the identified version; and responding, by the virtual container via the edge server, to the service request from the end-user device.

2. The method of implementing edge-based cloud computing of claim 1, further comprising determining that one or more containers are running the application used to process the service request.

3. The method of implementing edge-based cloud computing of claim 1, wherein the service request comprises one or more of: an application request, a data request, or a file request.

4. The method of implementing edge-based cloud computing of claim 1, wherein the identification information comprises one or more of: a media tag identifier, an application identifier, a source identifier, a data tag identifier, or an application accessible cookie.

5. The method of implementing edge-based cloud computing of claim 1, wherein the version of the requested service is identified based on different encoding profiles associated with the plurality of versions.

6. The method of implementing edge-based cloud computing of claim 5, wherein the encoding profiles are related to capabilities of end-user devices.

7. A method of responding to content-object requests, the method comprising:

determining an edge server from a plurality of edge servers to use to communicate with an end-user device based on an efficiency threshold, wherein: the edge server is within a first point of presence (POP) of a plurality of POPs; the plurality of POPs are part of a content delivery network; and the plurality of POPs are distributed geographically; receiving, at the determined edge server, a routed request for a content object from the end-user device, wherein the routed request includes identification information associated with the routed request for the content object and wherein the routed request further comprises a network identifier; identifying a plurality of versions of the content object based on the network identifier, each version of the content object having a corresponding encoding profile in a set of encoding profiles; based at least partly on the encoding profiles and the identification information, identifying a version of the content object from amongst the plurality of versions of the content object after receiving the routed request, wherein each of the plurality of versions is created prior to receiving any request for the content object; based at least partly on the identification information, determining an application used to process the routed request; forwarding the routed request to a functioning compute platform operating over a network in communication with the determined edge server, wherein: the compute platform contains instructions for running a plurality of applications; the plurality of applications comprise the application; and the plurality of applications are not running on the compute platform before the routed request from the end-user device is received; instantiating, at the compute platform, a virtual container, wherein the virtual container includes one or more resources and the application used to process the routed request, and wherein the virtual container is instantiated after the routed request from the end-user device is received; and responding to the routed request from the end-user device for the content object wherein the response is by the virtual container via the edge server.

8. The method of responding to content-object requests of claim 7, wherein the plurality of versions of the content object were created prior to receiving any request for the content object.

9. The method of responding to content-object requests of claim 7, wherein the container comprises one or more allocated resources, wherein the one or more allocated resources include one or more of: CPU resources, memory resources storage resources, or network resources.

10. The method of responding to content-object requests of claim 7, wherein each encoding profile in the set of encoding profiles comprises a plurality of encoding parameters including a bitrate, a frame size, and a media format.

11. The method of responding to content-object requests of claim 7 wherein each encoding profile in the set of encoding profiles comprises a plurality of encoding parameters, which are related to end-user device capabilities.

12. The method of responding to content-object requests of claim 7, wherein the identification information comprises at least one identifier of the end-user device, the at least one identifier comprises a hardware identifier, a software identifier, or a network connection of the end user-device, when the at least one identifier comprises a hardware identifier, the method further comprises:

determining a display capability of the end-user device at the policy server based on the hardware identifier; and identifying the version of the content object based on the determined display capability.

13. The method of responding to content-object requests of claim 7, wherein the identification information comprises at least one identifier of the end user-device, the at least one identifier comprises a hardware identifier, a software identifier, or a network connection of the end-user device, when the at least one identifier comprises a hardware identifier, the method further comprises:

determining a bandwidth capability of the end user-device based on the network connection; and identifying the version of the content object based on the bandwidth capability.

14. A non-transitory computer-readable medium having sets of instructions stored thereon which, when executed by a computer, cause the computer to:

determine an edge server from a plurality of edge servers to use to communicate with an end-user device, wherein: the edge server is within a first point of presence (POP) of a plurality of POPs; the plurality of POPs are part of a content delivery network; and the plurality of POPs are distributed geographically; receive, at the determined edge server, a request for a content object from the end-user device, wherein the request includes a network identifier and request information; based at least partly on the request information, determine device capabilities of the end-user device; based at least partly on the network identifier, identify a plurality of versions of the content object, the plurality of versions of the content object having been created prior to receiving any request for the content object, each version of the plurality of versions of the content object having a corresponding encoding profile in a set of encoding profiles, wherein each of the plurality of versions is created prior to receiving any request for the content object; determine an application used to process the request; forward the request to a functioning compute platform operating over a network in communication with the determined edge server, wherein: the compute platform contains instructions for running a plurality of applications; the plurality of applications comprise the application; and the plurality of applications are not running on the compute platform before the request from the end-user device is received; instantiate, at the compute platform, a virtual container, wherein the virtual container includes one or more resources and the application used to process the request, and wherein the virtual container is instantiated after the request from the end-user device is received and includes the functionality of the identified version; and respond, via the edge server, to the request for the content from the end-user device.

15. The computer-readable medium of claim 14, wherein the container comprises one or more allocated resources, wherein the one or more allocated resources include one or more of: CPU resources, memory resources storage resources, or network resources.

16. The computer-readable medium of claim 14, wherein the sets of instructions stored thereon, when executed by the computer, further cause the computer to:

determine a delivery orchestration scheme based on the determined end-user device capabilities; and send the selected version of the content object to the end-user device using the determined delivery orchestration scheme.

17. The computer-readable medium of claim 14, wherein the request information comprises at least one of device identifiers, usage statistics, cookies, or user preferences associated with the end-user device.

18. The computer-readable medium of claim 14, wherein each encoding profile in the set of encoding profiles comprises a plurality of encoding parameters including a bitrate, a frame size, and a media format.

* * * * *